United States Patent [19]
Malhotra et al.

[11] Patent Number: 6,086,661
[45] Date of Patent: Jul. 11, 2000

[54] INK COMPOSITIONS

[75] Inventors: Shadi L. Malhotra; James D. Mayo; Marcel P. Breton, all of Mississauga, Canada

[73] Assignee: Xerox Corporation, Stamford, Conn.

[21] Appl. No.: 09/300,210

[22] Filed: Apr. 27, 1999

[51] Int. Cl.$^7$ .................................................. C09D 11/00
[52] U.S. Cl. ..................... 106/31.43; 106/31.29; 106/31.61; 106/31.75; 106/31.49; 106/31.78
[58] Field of Search ............................ 106/31.29, 31.61, 106/31.43, 31.75, 31.58, 31.86, 31.49, 31.78

[56] References Cited

U.S. PATENT DOCUMENTS

| | | | |
|---|---|---|---|
| 3,985,663 | 10/1976 | Lu et al. | 252/62.1 L |
| 4,490,731 | 12/1984 | Vaught | 346/140 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,041,161 | 8/1991 | Cooke et al. | 106/22 |
| 5,098,477 | 3/1992 | Vieira et al. | 106/22 |
| 5,111,220 | 5/1992 | Hadimioglu et al. | 346/140 R |
| 5,121,141 | 6/1992 | Hadimoglu et al. | 346/140 R |
| 5,122,187 | 6/1992 | Schwarz et al. | 106/25 |
| 5,124,718 | 6/1992 | Koike et al. | 346/1.1 |
| 5,371,531 | 12/1994 | Rezanka et al. | 347/43 |
| 5,382,492 | 1/1995 | El-Sayed et al. | 430/115 |
| 5,518,534 | 5/1996 | Pearlstine et al. | 106/20 R |
| 5,531,818 | 7/1996 | Lin et al. | 106/23 C |
| 5,667,568 | 9/1997 | Sacripante et al. | 106/20 R |
| 5,667,572 | 9/1997 | Taniguchi et al. | 106/31.36 |
| 5,690,721 | 11/1997 | Itoh | 106/31.13 |
| 5,698,017 | 12/1997 | Sacripante et al. | 106/31.49 |
| 5,698,128 | 12/1997 | Sakai et al. | 219/745 |
| 5,700,316 | 12/1997 | Pontes et al. | 106/31.58 |
| 5,709,737 | 1/1998 | Malhotra et al. | 106/31.43 |
| 6,001,899 | 12/1999 | Gundlach et al. | 106/31.43 |

*Primary Examiner*—Mark L. Bell
*Assistant Examiner*—Veronica F. Faison
*Attorney, Agent, or Firm*—E. O. Palazzo

[57] ABSTRACT

An aqueous ink composition comprised of (1) a quaternary compound selected from the group consisting of (a) imidazolinium quaternary salts, (b) phosphonium quaternary salts, and (c) an ammonium quaternary salt; (2) a liquid ink vehicle; (3) a paper-curl reducing compound; (4) a lightfastness component; (5) a lightfastness antioxidant; (6) a substantially water soluble organic salt or a substantially water soluble inorganic salt; (7) a biocide; and (8) a colorant.

35 Claims, No Drawings

INK COMPOSITIONS

Inks are illustrated in U.S. Pat. Nos. 5,931,995; 5,902,390; 5,876,492 and 5,922,117, and copending applications U.S. Ser. No. 933,914; and U.S. Ser. No. 09/281,571, U.S. Ser. No. 09/281,540, U.S. Ser. No. 09/281,682, U.S. Ser. No. 09/300,331, U.S. Ser. No. 09/300,193, U.S. Ser. No. 09/300,333, and U.S. Ser. No. 09/300,332, U.S. Ser. No. 09/300,373, and U.S. Ser. No. 091/300,298, the disclosures of each being totally incorporated herein by reference.

The appropriate components and processes of the above copending applications may be selected for the present invention in embodiments thereof.

BACKGROUND OF THE INVENTION

The present invention is directed to ink compositions useful, for example, in thermal and acoustic ink jet printing processes. More specifically, the present invention relates to fast drying, penetrating inks with, for example, a surface tension of between about 25 to about 44 dynes/cm, and preferably between about 30 to about 39 dynes/cm, and which inks can be selected for acoustic ink jet processes, especially electric field assisted acoustic ink jet printing processes and apparatuses, reference, for example, U.S. Pat. Nos. 5,121,141, 5,111,220, 5,371,531, the disclosures of which are totally incorporated herein by reference, and the acoustic ink processes as illustrated in the above appropriate copending applications, such as an acoustic ink printer for printing images on a record medium such as size press treated plain papers, that is, for example, office papers, size press treated ink jet papers and coated pigmented papers, or coated ink jet papers.

The invention inks possess, for example, in embodiments excellent waterfastness, a surface tension of, for example, between about 25 to about 44 dynes/cm, and preferably between about 30 to about 39 dynes/cm, preferably measured at 25° C., and which inks can be comprised of (1) a waterfast alkylated quaternary compound that primarily preferably maintains the surface tension of the inks at from about 25 to about 44 dynes/cm and more preferably from about 25 to about 39 dynes/cm and which compound has a molecular weight, $M_w$ of, for example, from about 105 to about 995; (2) a liquid ink vehicle that, for example, can spread the ink into the pores of a substrate, such as paper, and which vehicle preferably possesses a low acoustic loss, which enables a reduction, or minimization of energy consumption, and which acoustic loss is, for example, below or about equal to about 30 dB/mm; (3) a paper-curl reducing compound (anti-curl compound) that primarily functions to reduce, minimize, or substantially eliminate the curl of paper to about 5 to about 10 millimeters; (4) a lightfast antioxidant; (5) a water soluble organic salt, a water soluble inorganic salt, or mixtures thereof; (6) a biocide; (7) a colorant such as a dye, a pigment or mixtures thereof; and (8) an optional component, such as a diluent, like water, or other similar solvent, and preferably deionized water.

More specifically, the present invention is directed to aqueous inks comprised of (1) a waterfast alkylated quaternary compound, such as soya amidopropyl ethyldimonium ethyl sulfate, (Schercoquat, SOAS, Scher Chemicals), stearyl tributyl phosphonium bromide (Aldrich 29,303-2), cetylpyridinium chloride monohydrate, (Aldrich #85,556-1), or 1-dodecylpyridinium chloride hydrate (Aldrich #33,124-4) that, for example, maintains the surface tension of the inks from, for example, about 25 to about 44 dynes/cm, or about 30 to about 40 and preferably from about 30 to about 5 39 dynes/cm, and which compound has a molecular weight $M_w$ of, for example, from 105 to about 995; (2) a liquid ink vehicle; (3) a paper curl reducing compound, or anticurl compound that, for example, reduces the curl of paper to about 2 to about 5, or to about 3 to about 4 millimeters; (4) a lightfastness UV absorber; (5) an antioxidant; (6) a water soluble organic or inorganic salt; (7) a biocide; and (8) a colorant such as a dye, a pigment or mixtures thereof, and wherein there can be generated with such inks excellent developed images on, for example, size press treated plain papers and coated pigmented papers with acceptable image permanence, excellent projection efficiency on transparencies and excellent crease resistance, and wherein the inks possess acceptable, and in embodiments superior lightfastness of, for example, from about 90 to about 100 percent and superior waterfastness of, for example, from about 95 to about 100 percent. Moreover, in embodiments of the present invention there is enabled the elimination, or minimization of undesirable paper curl. Also, advantages of the low viscosity inks of the present invention resides in reduced power consumption by about 50 percent, thereby increased printing speed from about 25 pages per minute to about 60 pages per minute, improved jettability, that is, the drop size of the ink is uniform all across the print head allowing improved ink directionality, where the velocity of the ink drops has a standard deviation value of, for example, from about 3 to about 5 microns and consequently lower edge raggedness, such as a value of about 5 microns and preferably lower than about 3 microns. The edge raggedness, which can be measured with an optical microscope, is the deviation of the average width a line measured from the middle of the line to the edge of the line (also known as mid-frequency line-edge noise (MFLN)).

PRIOR ART

Inks with quaternary ammonium compounds are illustrated in U.S. Pat. No. 3,985,663, which discloses inks containing quaternary ammonium compounds of the formula $[NR_4]^+A^-$ in which at least one R is a hydrocarbon with, for example, from about 1 to about 18 carbon atoms and each other R is a hydrogen or a hydrocarbon having from about 1 to about 18 carbon atoms and A is an anion. Examples of compounds disclosed are tetrabutyl ammonium bromide, tetrabutyl ammonium iodide and tetraheptyl ammonium bromide. The lower alkyl tetra alkyl quaternary salts, such as tetrabutyl ammonium bromide and tetra heptyl ammonium bromide of U.S. Pat. No. 3,985,663, are not believed to be suitable effective dye fixative compounds for the inks of the present invention (Comparative Example 5 and Comparative Example 6) primarily because of their short chain length (4 carbons in butyl to 7 carbons in heptyl) of the alkyl group. The higher chain length alkyl group compounds of the tetra alkyl quaternary salts, such as tetradodecyl ammonium bromide, are only partly soluble, for example, tetra heptyl ammonium bromide, tetra octyl ammonium bromide, and tetradodecyl ammonium bromide have solubility values of 1 percent, 0.7 percent, and 0.1 percent by weight of. Furthermore, tetrabutyl ammonium bromide and tetra heptyl ammonium bromide compounds of U.S. Pat. No. 3,985,663 do not appear lower the surface tension of inks and their solubility decreases with increasing chain length (from 5 percent by weight of for tetrabutyl ammonium bromide to about 0.7 percent by weight of for tetra heptyl ammonium bromide and about 0.1 percent by weight of for tetra dodecyl ammonium bromide), which amount is not believed to be sufficient for fixing dyes in inks. The dye fixatives of the present invention derived from imidazolinium salts, ammonium salts and phosphonium salts are highly soluble in the inks, for example, imidazolinium salts, and ammonium salts are soluble in an amount of from about 4 percent by weight of to about 6 percent by weight of and the phosphonium salts are soluble in an amount of from about 2 to about 4 percent by weight of, especially when the ratio of the dye fixative to the dye in the ink varies from about 0.5 to about 1.5, that is, for example, for 4 percent by weight of the dye in the ink, about 2 to about 6 percent by weight of the dye fixative and preferably about 4 percent of the dye fixative is selected.

U.S. Pat. No. 5,382,492 discloses quaternary ammonium compounds as charge adjuvants for positive electrostatic liquid developers containing (A) a nonpolar liquid having a Kauri-butanol value of less than 30, present in a major amount; (B) thermoplastic resin particles having dispersed therein a quaternary ammonium compound which is substantially insoluble in the nonpolar liquid and can be represented by the general formula

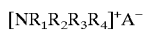

$[NR_1R_2R_3R_4]^+A^-$ wherein $R_1$, $R_2$, $R_3$, and $R_4$ may be the same or different and are hydrogen, alkyl of 1 to 40 carbon atoms, aryl of 6 to 30 carbon atoms, and wherein any of the $R_1$, $R_2$, $R_3$, and $R_4$ may be joined to form a 5 or 6 membered ring and $A^-$ is an anion; and (C) a nonpolar liquid soluble ionic or zwitterionic charge director compound. Examples of quaternary compounds of U.S. Pat. No. 5,382,492 include benzylcetyldimethyl ammonium chloride monohydrate, tetraethyl ammonium acetate tetrahydrate, cetylpyridinium chloride monohydrate, tetrapentyl ammonium bromide, mixtures of cetylpyridinium chloride monohydrate with benzylcetyldimethyl ammonium chloride monohydrate, and mixtures of tetrapentyl ammonium bromide with benzylcetyldimethyl ammonium chloride monohydrate. Also, the quaternary compounds of U.S. Pat. No. 5,382,492, such as tetra ethyl ammonium acetate tetrahydrate and tetrapentyl ammonium bromide, are believed to yield high surface tension inks (surface tension of about 53 dynes/cm). Some of the other quaternary salts of this patent, such as cetylpyridinium chloride monohydrate, is soluble only up to about 0.7 percent by weight of (Comparative Example 7), for example the quaternary compound benzylcetyldimethyl ammonium chloride precipitated out of the black, cyan and magenta dyes of the ink solution.

Inks containing mineral acid salts or organic acid salts are illustrated, for example, in U.S. Pat. No. 5,518,534, which discloses an ink set and process for alleviating bleed in printed elements employing a first ink and a second ink, each containing an aqueous carrier medium and a colorant, the colorant in the first ink being a pigment dispersion and the colorant in the second ink containing a salt of an organic acid or mineral acid with a solubility of at least 10 parts in 100 parts of water at 25° C.

U.S. Pat. No. 5,531,818 discloses a thermal ink jet printing process which comprises (a) incorporating into a thermal ink jet printer, an ink composition comprising water, a dye, and pigment particles having chemically bonded to the surfaces thereof a hydrophilic moiety selected from the group consisting of sulfonic acid salts, phosphoric acid salts, carboxylic acid salts, and mixtures thereof; and (b) causing droplets of the ink to be ejected in an imagewise pattern onto a recording medium by selectively heating the ink in the printer in an imagewise pattern, thereby generating images on the recording medium.

U.S. Pat. No. 5,709,737 discloses an ink composition comprising an aqueous liquid vehicle, a colorant, and an anticurl additive material selected from the group consisting of (a) symmetric acetylenic bisester alcohols; (b) symmetric acetylenic bisalkyl alcohols and acetylenic bisalkoxy alcohols; (c) symmetric acetylenic bisamido alcohols; (d) symmetric bisamido alcohols; (e) monoamido alcohols; (f) trialkyl hydroxy compounds; (g) derivatives of 1,2-diols and 1,3-diols; (h) thio diols; (i) aromatic diols; (j) heterocyclic diols; (k) imino alcohols; (l) salts of hydroxyl compounds; (m) saccharides and saccharide derivatives; and (n) mixtures thereof.

In acoustic ink printing, the printhead produces approximately 2.2 picoliter droplets by an acoustic energy process. The ink under these conditions should preferably display a viscosity of about 5 to 6 centipoise or less at the jetting temperature. Furthermore, once the ink is jetted onto the paper, the ink image should be of excellent crease property, and should be nonsmearing waterfast, of excellent transparency and excellent fix qualities. In selecting an ink for such applications, it is desirable that the vehicle display a low viscosity, such as from about 1 centipoise to about 10 centipoise in the acoustic head, while also displaying solid like properties after being jetted onto paper. Since the acoustic head can tolerate a temperature of up to about 100° C., and preferably up to a temperature of from about 40° C. to about 60° C., the vehicle for the ink should preferably display liquid like properties such as a viscosity of from about 1 to about 10 centipoise at a temperature of from about 50° C. to about 95° C., and preferably at 50° C.

SUMMARY OF THE INVENTION

While the known ink compositions and processes may be suitable for their intended purposes, a need remains for acoustic aqueous ink compositions suitable for electric field assisted ink jet printing. In addition, there is a need for aqueous ink compositions, which are compatible with a wide variety of plain papers and yield photographic quality images on plain and coated papers. Further, there is a need for aqueous ink compositions, which generate high quality, lightfast, and waterfast images on plain papers. There is also a need for aqueous ink jet ink compositions which generate high quality, fast-drying images on a wide variety of plain papers at low cost with high quality text and high quality graphics, and wherein the dye is retained on the paper surface while the ink vehicle can continue to spread within the paper structure. Additionally, there is a need for aqueous ink jet ink compositions, which exhibit minimal feathering. Moreover, there is a need for aqueous ink jet ink compositions, which exhibit minimal intercolor bleed. There is also a need for aqueous ink jet ink compositions, which exhibit excellent image permanence. Further, there is a need for aqueous ink jet ink compositions, which are suitable for use in acoustic ink jet printing processes. Additionally, there is a need for aqueous hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. These and other needs can be achievable with the inks of the present invention in embodiments thereof.

DETAILED DESCRIPTION OF THE INVENTION

Aspects of the present invention relate to an ink, preferably an aqueous ink composition comprised of (1) a quaternary compound selected from the group consisting of (a) imidazolinium quaternary salts, (b) phosphonium quaternary salts, and (c) an ammonium quaternary salt; (2) a liquid ink vehicle; (3) a paper-curl reducing compound; (4) a lightfastness component; (5) a lightfastness antioxidant; (6) a substantially water soluble organic salt or a substantially water soluble inorganic salt; (7) a biocide; and (8) a colorant; an ink which possesses a surface tension of from about 25 to about 44 dynes/cm at a temperature of from about 100° C. to about 165° C., and a pH of from about 6.5 to about 8.5; an ink composition wherein the quaternary compound has an average molecular weight $M_w$ of from about 105 to about 995; an ink composition wherein the quaternary compound has an average molecular weight $M_w$ of from about 450 to about 995; an ink composition wherein the quaternary compound is present in an amount of from about 1 to about 15 percent by weight, the ink vehicle is present in an amount of from about 69 to about 5 percent by weight, the paper-curl reducing component, or anticurl compound is present in an amount of from about 28 to about 5 percent by weight, the lightfastness component is present in an amount of from about 0.25 to about 5 percent by weight, the antioxidant is present in an amount of from about 0.25 to about 5 percent by weight, the colorant is present in an amount of from about 0.5 to about 10 percent by weight, the soluble salt is present in an amount of from about 0.25 to about 10 percent by weight, the biocide is present in an amount of from about 0.25 to about 1 percent by weight, and wherein the total of all ink components is about 100 percent; an ink composition wherein the imidazolinium quaternary compound is optionally present in an amount of from about 1 to about 15 percent by weight and is selected from the group consisting of (1) 1-tallow amido ethyl-3-methyl-2-heptadecylimidazolinium methyl sulfate; (2) methyl-1-tallow amido ethyl-2-tallow imidazolinium methyl sulfate; (3) methyl-1-hydrogenated tallow amido ethyl-2-hydrogenated tallow imidazolinium methyl sulfate; (4) 1-methyl-1-oleyl amido ethyl-2-oleyl-imidazolinium methyl sulfate; (5) isostearyl ethylimidonium ethyl sulfate; and (6) isostearyl benzylimidonium chloride; an ink composition wherein the phosphonium quaternary compound is optionally present in an amount of from about 1 to about 15 percent by weight and is selected from the group consisting of (1) hexadecyl tributyl phosphonium bromide; (2) stearyl tributyl phosphonium bromide; (3) dodecyl triphenyl phosphonium bromide; (4) hexyl triphenyl phosphonium bromide; (5) benzyl triphenyl phosphonium chloride; (6) (4-ethoxybenzyl)triphenyl phosphonium bromide; (7) 4-butoxybenzyl triphenyl phosphonium bromide; (8) 2-(1,3-dioxan-2-yl)ethyl] triphenyl phosphonium bromide; (9) (2-hydroxybenzyl triphenyl phosphonium bromide; and (10) tetra phenyl phosphonium chloride; an ink wherein the ammonium quaternary salt is optionally present in an amount of from about 1 to about 15 percent by weight and is selected from the group consisting of dialkyl substituted ammonium salts of (1) 1-propanaminium 2,3-dihydroxy-N-dimethyl-N-[3(oxococoyl) amino]propyl]-chloride; (2)dodecanoyl-N-methyl amino ethyl-(phenyl carbamyl methyl)dimethyl ammonium chloride; (3) dihydrogenated tallow dimethyl ammonium methyl sulfate; (4) dihydrogenated tallow dimethyl ammonium chloride; (5) dibehenyl/diarachidyl dimethyl ammonium chloride; (5) soya amido propyl benzyl dimonium chloride; (6) soya amido propyl ethyl dimonium ethyl sulfate; (7) gluconamidopropyl dimethyl-2-hydroxyethyl ammonium chloride; (8) minkamidopropyl dimethyl-2-hydroxyethyl ammonium chloride; (9) N-rapeseed-(3-amidopropyl)-N-N-dimethyl-N-(2,3 epoxy propyl)ammonium chloride; (10) N-safflower-(3-amidopropyl)-N-N-dimethyl-N-ethyl ammonium ethyl sulfate; (11) rapeseed amido propyl ethyl dimonium chloride; and (12) 2-hydroxypropyl-bis-1,3-(N-isostearyl amido propyl-N,N-dimethyl ammonium chloride); an ink composition wherein the ammonium quaternary salt is present in an amount of from about 1 to about 15 percent by weight and is selected from the group consisting of (1) tridecyloxypropyl dihydroxy ethyl methyl ammonium chloride; (2) methyl bis(2-hydroxy ethyl)coco ammonium chloride; (3) [2-(2-carboxy ethoxy)ethyl]2-(2-hydroxy)ethoxy)ethyl]methyl dodecyl ammonium methyl sulfate; (4) [2-(2-carboxy ethoxy)ethyl][2-(2-hydroxy)ethoxy ethyl]methyl octadecyl ammonium methyl sulfate; (5) N-tetradecyl dimethyl-naphthyl methyl ammonium chloride; (6) octadecyl diethanol methyl ammonium chloride; (7) octadecyl dihydroxy ethyl methyl ammonium chloride; (8) bis[(ethyl tallowate)]-2-hydroxyethyl methyl ammonium methyl sulfate; (9) ditallow amido ammonium methyl sulfate; (10) bis hydroxyethyl dihydroxypropyl stearaminium chloride; (11) methyl bis (oleyl amido ethyl)2-hydroxyethyl ammonium methyl sulfate; (12) methyl bis(soya amido ethyl), 2-hydroxyethyl ammonium methyl sulfate; and (13) methyl bis(tallow amido ethyl)2-hydroxy propylammonium methyl sulfate; an ink composition wherein the ink vehicle is present in an amount of from about 5 to about 70 percent by weight and wherein the vehicle is selected from the group consisting of (1) 2-pyrrolidinone; (2) 1-pyrrolidino-1-cyclohexene; (3) 2,2'-bithiophene; (4) 1-cyclohexyl-2-pyrrolidinone; (5) 1-octyl-2-pyrrolidinone; (6) 1,4-cyclohexanedimethanol; (7) 1-decyl-2-methyl-imidazole; (8) ethyleneglycol; (9) propylene carbonate; (10) tetramethylene sulfone; (11) 2,2'-thiodiethanol; (12) 2,2'-sulfonyidiethanol; (13) di(ethylene glycol); (14) di(ethyleneglycol)butylether; and (15) diethylene glycol dibutylether; an ink composition wherein the paper curl reducing compound is optionally present in the ink composition in an amount of from about 28 to about 5 percent by weight and is selected from the group consisting of (1) pentaerythritol propoxylate/ethoxylate; (2) triethanolamine ethoxylate; (3) 1,4-bis(2-hydroxy ethoxy)-2-butyne; (4) pantothenol; (5) 3-octadecyloxy-1,2-propanediol; (6) 3-(4-methoxy phenoxy)-1,2-propane diol; (7) 3-pyrrolidino-1,2-propanediol; (8) 3-piperidino-1,2-propanediol; (9) 3-morpholino-1,2-propanediol; and (10) 4-8-bis (hydroxymethyl)tricyclo [5.2.1.02.6]decane; an aqueous ink composition wherein the lightfastness component is optionally present in an amount of from about 0.25 to about 5 percent by weight and is selected from the group consisting of (1) N-(4-ethoxycarbonyl phenyl)-N'-ethyl-N'-phenyl formadine; (2) poly(4-hydroxy-2,2,6,6-tetramethyl-1-piperidine ethanol/dimethyl succinic acid); (3) poly[N,N-bis (2,2,6,6-tetramethyl-4-piperidinyl)-1,6-hexane-diamine-co-2,4-dichloro-6-morpholino-1,3,5-triazine); (4) 1-N-[poly(3-allyloxy-2-hydroxypropyl)-2 aminoethyl]-2-imidazolidine; and (5) poly(2-ethyl-2-oxazoline); an ink composition wherein the lightfast antioxidant is optionally present in an amount of from about 0.25 to about 5 percent by weight and is (1) 2,6-di-tert-butyl-α-dimethylamino-4-cresol; (2) 2,2'-isobutylidene-bis(4,6-dimethyl phenol); (3) 2,2'-methylenebis(6-tert-butyl-4-methylphenol; (4) 2,2'-methylenebis(6-tert-butyl-4-ethylphenol); (5) N-isopropyl-N'-phenyl-phenylene diamine; (6) N-(1,3 dimethylbutyl)-N'-phenyl-phenylene-diamine; (7) N,N'-di(2-octyl)-4-phenylene diamine; (8) N,N'-bis(1,4-dimethylpentyl)-4-phenylene diamine; (9) 2,4,6-tris-(N1,4-dimethyl pentyl-4-phenylenediamino)-1,3,5-triazine; or (10) D-raffinose pentahydrate; an ink composition wherein the water soluble salt optionally present in an amount of from about 0.25 to about 10 percent by weight, or from about 1.5 to about 5 percent by weight, and is an inorganic salt selected from the group consisting of (1) lithium bromide; (2) potassium bromide; (3) potassium iodide; (4) sodium chloride; (5) calcium nitrate tetrahydrate; (6) calcium sulfate dihydrate; (7) strontium chloride hexahydrate; (8) zinc nitrate hexahydrate; (9) zinc sulfate heptahydrate; and (10) magnesium nitrate hexahydrate; an ink composition wherein the water soluble salt is optionally present in an amount of from about 0.25 to about 10 percent by weight, or from about 1.5 to about 5 percent by weight, and is selected from the group consisting of (1) citric acid trilithium salt hydrate; (2) dodecyl sulfate lithium salt; (3) 1-octane sulfonic acid sodium salt; (4) 1-(2-ethoxyphenyl)piperazine monohydrochloride; (5) tris(hydroxymethyl)aminomethane; (6) (4-morpholino ethane sulfonic acid)monohydrate; (7) (4-morpholino propane sulfonic acid); (8) (β-hydroxy-4-morpholino propane sulfonic acid); (9) [N,N-bis(2 hydroxyethyl)-2-amino ethane sulfonic acid]; and (10) [4-(2-hydroxyethyl)-1-piperazine ethane sulfonic acid]; an ink composition wherein the biocide is (1) 2-hydroxypropylmethane thiosulfonate; (2) 2-(thio cyanomethyl thio) benzothiazole; (3) methylene bis(thiocyanate); (4) cationic poly(oxyethylene (dimethylamino)-ethylene (dimethylamino)ethylene dichloride; or (5) a cationic blend of methylene bisthiocyanate, about 50 percent by weight, and dodecyl guanidine hydrochloride, about 50 percent by weight; an ink wherein the colorant is a pigment, or a dye present in an amount of from about 0.5 to about 20 percent by weight; an ink wherein the colorant is a pigment of carbon black; an ink wherein the colorant is a pigment of cyan, magenta, yellow, black, or mixtures thereof; an ink with a surface tension of about 25 to about 44 dynes/cm, a viscosity of from about 1 centipoise to about 10 centipoise at a temperature of from about 25° C. to about 150° C., a pH of from about 6.5 to about 8.5, an acoustic-loss value of from about 10 to about 80 dB/mm, and which ink provides images with waterfast values of about 80 to about 95 percent, lightfast values of from about 95 to about 100 percent, and paper curl values of about 5 to about 10 millimeters; a printing process which comprises incorporating into an acoustic ink jet printer the ink of the present invention, and causing droplets of the ink to be ejected in imagewise pattern onto a substrate; an ink composition wherein the quaternary compound is present in an amount of from about 1 to about 15 percent by weight and is isostearyl ethylimidonium ethyl sulfate, 1-methyl-1-oleyl amidoethyl-2-oleyl-imidazolinium methyl sulfate, dodecyl triphenyl phosphonium bromide, or soya amido propyl ethyl dimonium ethyl sulfate; the ink vehicle is present in an amount of from about 69 to about 5 percent by weight and is ethylene glycol, diethylene glycol, or tetramethylene sulfone; the paper curl compound is present an amount from about 28 to about 5 percent by weight and is 1,4-bis(2-hydroxyethoxy)-2-butyne, pantothenol; the water soluble salt is present in an amount of from about 0.25 to about 10 percent by weight and is zinc sulfate heptahydrate, strontium chloride hexahydrate salt, magnesium nitrate hexahydrate, or tris(hydroxymethyl) aminomethane; the antioxidant is present in an amount of from about 0.25 to about 5 percent by weight and is D-raffinose pentahydrate; the lightfastness component is a UV absorber present in an amount of from about 0.25 to about 5 percent by weight and is N-(4-ethoxycarbonyl phenyl)-N'-ethyl-N'-phenyl formadine; the biocide is present in an amount of from about 0.25 to about 1 percent by weight and is methylene bisthiocyanate, dodecyl guanidine hydrochloride; and the colorant is present in an amount of from about 0.5 to about 10 percent by weight; an ink wherein the ink provides images with waterfast values of from about 80 to about 95 percent, lightfastness values of from about 95 to about 100 percent, and paper curl values of from about 5 to about 10 millimeters; an aqueous ink composition comprised of (1) a quaternary compound selected from the group consisting of (a) an imidazolium quaternary salt, (b) a phosphonium quaternary salt, (c) an ammonium quaternary salt; or mixtures thereof; (2) a liquid ink vehicle; (3) a paper-curl reducing compound; (4) a lightfastness compound; (5) an antioxidant; (6) a water soluble organic salt, or a water soluble inorganic salt; (7) a biocide; and (8) a colorant; an ink further containing (9) water, and wherein the quaternary compound has an average molecular weight $M_w$ of from about 105 to about 995, and which ink yields images with waterfast values of between about 80 to about 95 percent, lightfastness values of about 95 to about 100 percent, and curl values of about 5 to about 10 millimeters; an ink containing a diluent; an ink wherein the diluent is water, or is comprised of a mixture of water and an aliphatic glycol; an ink wherein water is present in an amount of from about 0.75 to about 44 percent by weight; an aqueous ink composition comprised of (1) a quaternary compound; (2) a liquid ink vehicle; (3) a paper-curl reducing compound; (4) a lightfastness compound; (5) an antioxidant; (6) a water soluble inorganic salt; (7) a biocide; and (8) a colorant; and waterfast aqueous inks comprised of (1) an alkylated quaternary compound, such as isostearyl ethylimidonium ethyl sulfate, (Monaquat-ISIES; Mona Industries), isostearyl benzylimidonium chloride, (Schercoquat 11B, Scher Chemicals), soya amido propyl ethyl dimonium ethyl sulfate, (Schercoquat, SOAS, Scher Chemicals), or stearyl tributyl phosphonium bromide (Aldrich 29,303-2), that maintains the surface tension of the inks between, for example, about 25 to about 44 dynes/cm, and preferably from about 25 to about 39 dynes/cm, and has a molecular weight $M_w$, weight average molecular weight of from about 105 to about 995, and preferably from about 450 to about 995; (2) a liquid ink vehicle that, for example, can spread the ink into the pores of paper and possesses, and which vehicle possesses, for example, a low acoustic loss, which enables a reduction, or minimization of energy consumption, and which acoustic loss is, for example, from about 10 to about 30 dB/mm; (3) a paper-curl reducing compound (anti-curl compound) that reduces the curl of paper to about 5 to about 10 millimeters, and preferably from about 2 to about 5 millimeters; (4) a lightfast UV absorber; (5) a lightfast antioxidant; (6) a water soluble organic salt or water soluble inorganic salt; (7) a biocide; (8) a colorant such as a dye, a pigment or mixtures thereof; and (9) a diluent, such as deionized water, and wherein there can be generated with such inks excellent developed images on plain and coated papers with acceptable image permanence, excellent projection efficiency on transparencies and excellent crease resistance, and wherein the inks possess acceptable, and in embodiments superior lightfastness, from about 90 to about 100 percent and superior waterfast from about 95 to 100 percent values.

The quaternary compound with a preferable molecular weight, $M_w$ of from about 105 to about 995 is present in, for example, an amount (throughout the amounts recited represent examples of amounts) of from about 1 to about 15 percent by weight of, the ink vehicle with, for example, an acoustic-loss value of from about 15 to about 60 dB/mm is present in the ink composition in an amount of, for example, from about 69 to about 5 percent by weight of, the curl reducing compound with, for example, an acoustic-loss value of from about 5 to about 40 dB/mm is present in the ink composition in an amount of from about 28 to about 5 percent by weight of, the lightfastness compound, such as the UV absorber is present, for example, in an amount of from about 0.25 to about 5 percent by weight of, the antioxidant is present in an amount of, for example, from about 0.25 to about 5 percent by weight of, the colorant is present in an amount of from about 0.5 to about 10 percent by weight of, the salt, such as the water soluble salt, is present in an amount of, for example, from about 0.25 to about 10 percent by weight of, the biocide is present in an amount of, for example, from about 0.25 to about 1 percent by weight of, and a diluent, such as deionized water, is added in an amount of, for example, from about 0.75 to about 44 percent by weight of, and wherein the total of all ink components is about 100 percent. In embodiments, the quaternary compound with a molecular weight, $M_w$, of from about 105 to about 995 is present in an amount of from about 5 to about 15 percent by weight of, the ink vehicle with an acoustic-loss value of from about 15 to about 60 dB/mm is present in the ink composition in an amount of from about 65 to about 30 percent by weight of, the paper-curl reducing compound with an acoustic-loss value of from about 5 to about 40 dB/mm is present in the ink composition in an amount from about 20 to about 5 percent by weight of, the UV absorber is present in an amount of from about 1 to about 5 percent by weight of, the antioxidant is present in an amount of from about 1 to about 5 percent by weight of, and the colorant is present in an amount of from about 1 to about 5 percent by weight of, the water soluble salt is present in an amount of from about 1.5 to about 5 percent by weight of, the biocide is present in an amount of from about 0.5 to about 1 percent by weight of, and water is present in an amount of from about 5 to about 29 percent by weight of, with the total of all ink components being about 100 percent.

The ink compositions contain the (1) quaternary compound; (2) ink vehicle; (3) anti-curl compound; (4) UV absorber; (5) antioxidant; (6) water soluble salt; (7) colorant; (8) biocide; and (9) diluent, such as water in, for example, the following range amounts of [1+69+28+0.25+0.25+0.25+ 0.25+0.25+0.75=100] to [15+5+5+5+5+10+44=100], and in the following preferred range amounts [5+65+20+1+1+1+ 1.5+0.5+5=100] to [15+30+5+5+5+5+1+29=100]. These composition ranges were stablished using a number of known techniques, such as a statistical design based on the analyses of the experimental data of viscosity at 50 to 100° C., jettability at 50 to 100° C., image quality (high optical density, low crease, high gloss), and lightfast, and waterfast values of images generated with various ink compositions.

Quaternary salts examples include:

(A) imidazolinium quaternary compounds with a solubility of for, example, between about 2 to about 8 percent by weight of the ink composition (1) 1-tallow amido ethyl-3-methyl-2-heptadecylimidazolinium methyl sulfate, (Carsosoft S-90, Lonza Inc.); (2) methyl-1-tallow amido ethyl-2-tallow imidazolinium methyl sulfate, (Accosoft 808, Lonza Inc.); (3) methyl-1-hydrogenated tallow amido ethyl-2-hydrogenated tallow imidazolinium methyl sulfate, (Varisoft 445, Sherex Chemicals); (4) 1-methyl-1-oleyl amidoethyl-2-oleyl-imidazolinium methyl sulfate, (Varisoft 3690, Sherex Chemicals); (5) isostearyl ethylimidonium ethyl sulfate, (Monaquat-ISIES; Mona Industries); (6) isostearyl benzylimidonium chloride, (Schercoquat 11B, Scher Chemicals);

(B) phosphonium quaternary salts with, for example, a solubility between about 2 to about 4 percent by weight of the ink composition, such as (1) hexadecyl tributyl phosphonium bromide (Aldrich #27,620-0); (2) stearyl tributyl phosphonium bromide (Aldrich #29,303-2); (3) dodecyltriphenyl phosphonium bromide, (Aldrich #17, 262-6); (4) hexyl triphenyl phosphonium bromide (Aldrich #30,144-2); (5) benzyl triphenyl phosphonium chloride (Aldrich #B3,280-7); (6) (4-ethoxybenzyl) triphenyl phosphonium bromide (Aldrich #26,648-5); (7) 4-butoxybenzyl triphenyl phosphonium bromide (Aldrich #27,489-5); (8) 2-(1,3-dioxan-2-yl)ethyl] triphenyl phosphonium bromide (Aldrich #21,959-2); (9) (2-hydroxybenzyl triphenyl phosphonium bromide (Aldrich #21,629-1); tetra phenyl phosphonium chloride, (Aldrich #21,879-0);

(C) monosubstituted ammonium salts from natural products, such as vegetables and oils, including (1) coco trimethyl ammonium chloride [(Arquad C-33, C-33W, C-50 from Akzo Chemie), (Noramium MC-50 from Diamond Shamrock), Jet Quat C-50 from Jetco Chemicals), Quartamin CPR from Kao Corporation)]; (2) palmityl trimethyl ammonium chloride (Adogen 444 from Sherex Chemicals); (3) oleyl trimethyl ammonium chloride (Noramium MO-50 from Diamond Shamrock); (4) soya trimethyl ammonium chloride [(Arquad S-20 Akzo Chemie), (Jet Quat S-2C-50 Jetco Chemicals), (Tomah Q-S from Tomah)]; (5) tallow trimethyl ammonium chloride [(Arquad T-50, T-27W Akzo Chemie), (Jet Quat T-50 Jetco Chemicals), (Quartamin TPR from Kao Corporation), (Radiaquat 6471 from Oleofina S.A.), (Adogen 471 from Sherex Chemicals), (Querton BGCL50 from Kenobel)]; (6) hydrogenated tallow trimethyl ammonium chloride [(Noramium MSH-50 from Diamond Shamrock), (Quartamin HTPR from Kao Corporation) Adogen 441 from Sherex Chemicals]; (7) ricinoleamidopropyl trimethyl ammonium methyl sulfate (Rewoquat RTM50, Rewo Quimica); (8) behenyl trimethyl ammonium chloride (Incroquat TMC/P, Croda Universal Inc.) and behenyl trimethyl ammonium methosulfate (Incroquat TMS, Croda Universal Inc a solubility between about 2 to about 4 percent by weight of the ink composition with a solubility, for example, of between about 2 to about 6 percent by weight of the ink composition, (D) alkyl salts with a solubility, for example, of between about 2 to about 5 percent by weight of the ink composition such as (1) 1-propanaminium 2,3-dihydroxy-N-dimethyl-N-[3(oxococoyl)amino] propylchloride (Lexquat AMG-WC, Inolex Chemical Corporation); (2) dodecyl (2-hydroxy-1-methyl-2-phenyl-ethyl)dimethyl ammonium bromide (Aldrich #23,540-7); (3) (dodecyl dimethyl-2-phenoxyethyl) ammonium bromide (domiphen bromide Aldrich #24, 748-0); (4) dodecanoyl-N-methyl amino ethyl-(phenyl carbamyl methyl)dimethyl ammonium chloride (Desogen from Ciba Geigy PLC); (5) 3-chloro-2-hydroxypropyl N,N,N-dimethyl decyl ammonium chloride Quab 342 from Degussa; (6) 3-chloro-2-hydroxypropyl N,N,N-dimethyl octadecyl ammonium chloride, Quab 426 from Degussa; (7) benzyl hydrogenated tallow dimethyl ammonium chloride (Arquad DMHTB-75 from Akzo Chemie, Kemamine BQ-9702C from Witco Chemicals, Querton 441-BC, HBG BCL from Kenobel); (8) benzyl behenyl dimethyl ammonium chloride (Incroquat behenyl BDQ/P from Croda Universal Inc., Kemamine Q-2802-C from Witco Chemicals); (9) disoya dimethyl ammonium chloride (Arquad 2S-75 from Akzo Chemie); (10) ditallow dimethyl ammonium chloride (Adogen 470, Sherex Chemicals); (11) dihydrogenated tallow dimethyl ammonium methyl sulfate (Accosoft 748 from Stepan); (12) dihydrogenated tallow dimethyl ammonium chloride (Arquad 2HT-75, Akzo Chemie, Kemamine Q-9702C, Witco, Carsosoft V-90, V-100, Lonza Inc., Adogen 442, Sherex Chemicals, Varisoft 3262, Varisoft DHT, Sherex Chemicals, Radiaquat 6442, Oleofina S.A., Jet Quat 2HT-75, Jetco Chemicals, Accosoft 707, Stepan), (13) dibehenyl/diarachidyl dimethyl ammonium chloride (Kemamine Q-1902C, 1302C from Witco Chemicals); (14) difatty acid isopropyl ester dimethyl ammonium methyl sulfate (Rewoquat CR 3099 from Rewo Quimica, Loraquat CR 3099 from Dutton and Reinisch); (15) tallow dimethyl trimethyl propylene diammonium chloride (Tomah Q-D-T from Tomah); (16) N-cetyl, N-ethyl morpholinium ethosulfate (G-263, ICI Americas); (17) Soya amido propyl benzyl dimonium chloride (Schercoquat, SOAB, Scher Chemicals); (18) Soya amido propyl ethyl dimonium ethyl sulfate, (Schercoquat, SOAS, Scher Chemicals); (19) Soya dicoco quaternary ammonium chloride, (Jet Quat S-2C-50, Jetco Chemicals); (20) Gluconamidopropyl dimethyl-2-hydroxyethyl ammonium chloride (Quaternium 22), (Ceraphyl 60, Van Dyk); (21) N-tallow pentamethyl propane diammonium dichloride (Adogen 477 from Sherex Chemicals); (22) N-alkyl-N-N-dimethyl-N(dodecyl acetate) ammonium chloride (Schercoquat ALA, Scher Chemicals); (23) minkamidopropyl dimethyl-2-hydroxyethyl ammonium chloride (Quaternium 26), (Ceraphyl 65, Van Dyk); (24) N-Rapeseed-(3-amidopropyl)-N-N-dimethyl-N-(2,3 epoxy propyl)ammonium chloride, (Schercoquat ROEP, Scher Chemicals); (25) N-Safflower-(3 amidopropyl)-N-N-dimethyl-N-ethyl ammonium ethyl sulfate, (Schercoquat SAS, Scher Chemicals); (26) N-stearyl-(3-amido propyl)-N,N-dimethyl-N-ethyl ammonium ethyl sulfate, (Schercoquat FOAS, Scher Chemicals); (27) N-stearyl-(3-amido propyl)-N, benzyl ammonium chloride (Schercoquat SAB, Scher Chemicals); (28) isostearamido propyl ethyl dimethyl ammonium ethosulfate (Schercoquat 1AS-LC from Scher Chemicals); (29) N-ethyl ether-bis-1,4(N-isostearyl amido propyl-N,N-dimethyl)ammonium chloride, (Schercoquat 21AE, Scher Chemicals); (30) rapeseed amido propyl benzyl dimonium chloride (Schercoquat ROAB, Scher Chemicals); (31) rapeseed amido propyl ethyl dimonium chloride, (Schercoquat ROAS, Scher Chemicals); (32) isostearyl ethyl imidonium ethosulfate, ricinoleamidopropyl ethyl dimonium ethosulfate, (Lipoquat R, Lipo Chemicals); (33) 2-hydroxypropyl-bis-1,3-(N-isostearyl amido propyl-N,N-dimethyl ammonium chloride), (Schercoquat 21AP, Scher Chemicals); and (E) trialkyl substituted ammonium salts with a solubility, for example, of between about 2 to about 4 percent by weight of the ink composition, such as (1) tridecyloxypropyl dihydroxy ethyl methyl ammonium chloride, (Tomah Q-17-2, Tomah); (2) methyl bis (2-hydroxy ethyl)coco ammonium chloride (Adogen 638, Sherex Chemicals); (3) [2-(2-carboxy ethoxy)ethyl][2-(2-hydroxy)ethoxy ethyl]methyl dodecyl ammonium methyl sulfate (Sanac C, Armstrong Chemical Company Ltd.); (4) [2-(2-carboxy ethoxy)ethyl][2-(2-hydroxy)ethoxy ethyl]methyl octadecyl ammonium methyl sulfate, (Sanac, S, Armstrong); (5) N-tetradecyl dimethyl-naphthyl methyl ammonium chloride (BTC 1100, Onyx); (6) octadecyl diethanol methyl ammonium chloride, (M-Quat 32, Mazer Chemicals); (7) Octadecyl dihydroxy ethyl methyl ammonium chloride, (Tomah Q-18-2, Tomah); (8) bis [(ethyl tallowate)]-2-hydroxyethyl methyl ammonium methyl sulfate (Stepantex VS-90, Q-90B, Stepan, Finsoft HCM-100 from Finetex Inc.); (9) dihydrogenated tallow benzyl methyl ammonium chloride (Variquat B 343, Sherex Chemicals); (10) ditallow amido ammonium methyl sulfate (Rewoquat W222LM from Rewo Quimica); (11) tallow propylene diamine polyethylene glycol ammonium methyl sulfate (Rewoquat DQ35 from Rewo Quimica S.A.); (12) bis hydroxyethyl dihydroxypropyl steaminium chloride (Monaquat TG, Mona Industries); (13) methyl bis(oleyl amido ethyl) 2-hydroxyethyl ammonium methyl sulfate (Varisoft 222-LT from Sherex Chemicals); (14) methyl bis(soya amido ethyl), 2-hydroxyethyl ammonium methyl sulfate (Accosoft 750 from Stepan); (15) methyl bis (tallow amido ethyl)2-hydroxy propylammonium methyl sulfate, (Varisoft 238-90 percent, Sherex Chemicals and Accosoft 620-90 from Stepan); and (16) methyl bis(tallow amido ethyl)-2-hydroxy ethyl ammonium methyl sulfate, (Varisoft 222-90 percent, 222-HV, Sherex Chemicals and Accosoft 550L-90 from Stepan).

The ink vehicles, preferably with an acoustic-loss value of from about 15 to about 60 dB/mm, are present in the ink composition in an amount of, for example, from about 69 to about 5 percent by weight of, and preferably in an amount of from about 65 to about 30 percent by weight of, and examples of these vehicles are (1) ethylene glycol, (Aldrich #10,246-6); (2) propylene glycol, (Aldrich #24,122-9); (3) 1,3-propanediol, (Aldrich #P5,040-4); (4) 1,2-butanediol, (Aldrich #17,765-2), (5) 1,3-butanediol, (Aldrich #23,946-1); (6) 1,4-butanediol, (Aldrich #24,055-9); (7) 2,3 butanediol, (Aldrich #B8,490-4); (8) propylene carbonate, (Aldrich #P5,265-2); (9) tetramethylene sulfone, (Aldrich #T2,220-9); (10) 2,2'-thiodiethanol, (Aldrich #16,678-2); (11) 2,2'-sulfonyidiethanol, (Aldrich #18,008-4); (12) di(ethyleneglycol) (Aldrich #H2,645-6); (13) di(ethyleneglycol) butylether, (Aldrich #11,031-0); (14) diethylene glycol dibutylether, (Aldrich #20,562-1); (15) glycerol, (Aldrich #13,487-21); (16) 2-pyrrolidinone, (Aldrich #24,033-8); (17) 1-pyrrolidino-1-cyclohexene, (Aldrich #P7,400-1); (18) 2,2'-bithiophene, (Aldrich #24, 163-6); (19) 1-cyclohexyl-2-pyrrolidinone, (Aldrich #23, 225-4); (20) 1-octyl-2-pyrrolidinone, (Aldrich #33,218-6); (21) 1,4-cyclohexanedimethanol, (Aldrich #12,559-8); (22) 1-decyl-2-methylimidazole, (Aldrich #43,379-9); and the like. Water may also be selected as an ink vehicles in embodiments. Examples of paper-curl reducing compounds, which primarily reduce, or minimize paper curl, and preferably with an acoustic-loss value of from about 5 to about 40 dB/mm, is preferably present in the ink composition in an amount from about 28 to about 5 percent by weight of, and more preferably from about 20 to about 5 percent by weight of, examples of which are (1) pentaerythritol ethoxylate, (Aldrich #41,615-0, #41,873-0); (2) pentaerythritol propoxylate, (Aldrich #41,874-9,41,875-7); (3) pentaerythritol propoxylate/ethoxylate, (Aldrich #42,502-8); (4) triethanol amine ethoxylate, (Aldrich #41,658-4); (5) 1,4-bis (2-hydroxyethoxy)-2-butyne, (Aldrich #B4,470-8); (6) pantothenol, (Aldrich #29,578-7); (7) 3-methoxy-1,2-propanediol, (Aldrich #26,040-1); (8) 3-allyloxy-1,2-propanediol, (Aldrich #25,173-9); (9) 3-ethoxy1,2- propanediol, (Aldrich #26,042-8); (10) 3-phenoxy-1,2-propanediol, (Aldrich #25,781-8); (11) 3-octadecyloxy -1,2-propanediol, (Aldrich #B40-2); (12) 3-(4-phenoxy)-1,2-propanediol, (Aldrich #21,024-2); (13) mephensin [3-(2 methyl phenoxy)-1,2-propanediol], (Aldrich #28,656-7); (14) 3-(diethylamino)1,2-propanediol (Aldrich #21,849-9); (15) 2-phenyl-1,2-propanediol, (Aldrich #21,376-4); (16) 3-pyrrolidino-1,2-propanediol, (Aldrich #21,851-0); (17) 3-piperidino-1,2-propanediol, (Aldrich 21, #849-9); (18) 3-morpholino-1,2 propanediol, (Aldrich #21,848-0); (19) 4-8-bis(hydroxymethyl)tricyclo [5.2.1.02.6]decane, (Aldrich #B4,590-9); (20) 1-[N,N-bis(2-hydroxyethyl) isopropanolamine, (Aldrich #23,375-7); (21) N,N-bis(2-hydroxypropyl) ethanolamine, (Karl-Industries); (22) 1-[2-(2-hydroxyethoxy)ethyl]-piperazine, (Aldrich #33,126-0); (23) 1-4-bis(2-hydroxy ethyl)piperazine, (Aldrich #B4, 5402); (24) 3,6-dimethyl-4-octyne-3,6-diol, (Aldrich #27, 840-8); (25) 2-(hydroxymethyl)-1,3-propanediol, (Aldrich #39,365-7); (26) 2,4,7,9-tetramethyl-5-decyne-4,7-diol, (Aldrich #27,838-6); and mixtures thereof.

Lightfastness compounds, such as UV absorbers, that primarily function to protect developed images from UV degradation and are preferably present in an amount of, for example, from about 0.25 to about 5 percent by weight of, and more preferably from about 1 to about 3 percent by weight of, include (1) N-(4-ethoxycarbonyl phenyl)-N'-ethyl-N'-phenyl formadine, Givesorb-UV-2, Givaudan Corporation; (2) poly(4-hydroxy-2,2,6,6-tetramethyl-1-piperidine ethanol/dimethyl succinic acid), Tinuvin 622LD, Ciba-Geigy Corporation; (3) poly[N,N-bis(2,2,6,6-tetramethyl-4-piperidinyl)-1,6-hexane-diamine-co-2,4-dichloro-6-morpholino-1,3,5-triazine), Cyasorb UV-3346, Aldrich #41,324-0; (4) 1-[N-[poly(3-allyloxy-2-hydroxypropyl)-2-aminoethyl]-2-imidazolidinone, Aldrich #41,026-8; (5) poly(2-ethyl-2-oxazoline), #37,284-6, #37, 285-4, #37,397-4, Aldrich Chemical Company; or mixtures thereof in embodiments.

Examples of lightfastness antioxidants that primarily protect the images from oxidation, and which are preferably present in an amount of, for example, from about 0.25 to about 5 percent by weight of, and more preferably from about 1 to about 3 percent by weight of, include (1) 2,6-di-tert-butyl-α-dimethylamino-4-cresol, Ethanox-703, Ethyl Corporation; (2) 2,2'-isobutylidene-bis(4,6-dimethyl phenol), Vulkanox NKF, Mobay Chemicals; (3) 2,2'-methylenebis(6-tert-butyl-4-methylphenol), (Cyanox-2246, Aldrich #41,315-5); (4) 2,2'-methylenebis(6-tert-butyl-4-ethylphenol), (Cyanox-425, Aldrich #41,314-3); (5) N-isopropyl-N'-phenyl-phenylene diamine, Santoflex-IP, Monsanto Chemicals; (6) N-(1,3-dimethylbutyl)-N'-phenyl-phenylene-diamine, Santoflex-13, Monsanto Chemicals; (7) N,N'-di(2-octyl)-4-phenylene diamine, Antozite-1, Vanderbilt Corporation; (8) N,N'-bis(1,4-dimethylpentyl)-4-phenylene diamine, Santoflex-77, Monsanto Chemicals; (9) 2,4,6-tris-(N-1,4-dimethyl pentyl-4-phenylenediamino)-1,3, 5-triazine, Durazone-37,Uniroyal Corporation; or (10) D-raffinose pentahydrate (Aldrich 20,667-9).

Water soluble salts present, for example, in an amount of from about 0.25 to about 10 percent by weight of, and preferably from about 1.5 to about 5 percent by weight of, include inorganic salts, such as (1) lithium bromide, (Aldrich #30,837-4); (2) potassium bromide (Aldrich #24, 341-8); (3) potassium iodide (Aldrich #22,194-5); (4) sodium chloride (Aldrich #31,016-6); (5) calcium nitrate tetrahydrate (Aldrich #23,712-4); (6) calcium sulfate dihydrate (Aldrich #25,554-8); (7) strontium chloride hexahydrate, (Aldrich #25,552-1); (8) zinc nitrate hexahydrate (Aldrich #22,873-7); (9) zinc sulfate heptahydrate (Aldrich #22,137-6); (10) magnesium nitrate hexahydrate, (Aldrich #23,717-5), or mixtures thereof where one component is present in an amount of between 25 to 75 percent by weight of and the second component is present in an amount of between 75 to 25 percent by weight of the total salt, and the like. Organic salt examples are (1) citric acid trilithium salt hydrate (Aldrich #21,320-9); (2) dodecyl sulfate lithium salt (Aldrich #86,190-1); (3) 1-octane sulfonic acid sodium salt (Aldrich #22,156-2); (4) 1-(2-ethoxyphenyl) piperazinemonohydro chloride; (5) tris(hydroxymethyl) aminomethane, (Aldrich #22,194-5); (6) (4-morpholino ethane sulfonic acid)monohydrate; (7) (4-morpholino propane sulfonic acid); (8) (5-hydroxy-4-morpholino propane sulfonic acid); (9) [N,N-bis(2-hydroxyethyl)-2-amino ethane sulfonic acid or; (10) [4-(2-hydroxyethyl)-1-piperazine ethane sulfonic acid], or mixtures thereof where one component is present in an amount of between 25 to 75 percent by weight of and the other component is present in an amount of between 75 to 25 percent by weight of the total salt and the like.

Suitable colorants, present in an effective amount generally of from about 0.5 to about 25 percent, and preferably from about 2 to about 12 by weight of, include pigments and dyes, with water soluble dyes being preferred. Any suitable dye or pigment may be chosen, provided for example, that it is preferably capable of being dispersed or substantially dissolved in the vehicle and is compatible with the other ink components. Colorants include pigments, dyes, mixtures thereof, mixtures of dyes, mixtures of pigments, and the like.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange), (Matheson, Colemen Bell); Sudan II (Orange), (Matheson, Colemen Bell); Sudan Orange G (Aldrich #), Sudan Orange 220 (BASF); Paliogen Orange 3040 (BASF); Ortho Orange OR 2673 (Paul Uhlich); Paliogen Yellow 152,1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); SucoYellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as Regal 330® (Cabot), Carbon Black 5250, Carbon Black 5750 (Columbia Chemical Company).

Dye examples are Pontamine; Food Black 2; Carodirect Turquoise FBL Supra Conc. (Direct Blue 199) available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X-34, available from BASF; Carta Black 2GT, available from Sandoz, Inc., and the like. Project Cyan 1[10 percent dye solution in water], ICI; Acid Blue 9; Project Magenta 1T dye [10 percent dye solution in water], ICI; Projet Magenta 3BOA dye, ICI; Acid Red 52[10 percent dye solution in water]; Projet Yellow OAM dye [8.5 percent dye solution in water]; Projet Yellow 1G dye, obtained from ICI, Acid Yellow 17 obtained from Tricon Colors ICI; Projet Fast Black 2 dye (4.4 percent dye solution in water); ICI; BASF X-34 (33.4 percent dye solution in water), Food Black 2, Direct Black 19; Direct Black 168 are preferred dyes that may be selected.

The preferred biocides present in an effective amount generally of for example, from about 0.25 to about 1 percent by weight of, and preferably from about 0.5 to about 1 percent 0.99 by weight of, include (A) nonionic biocides, such as (1) 2-hydroxypropylmethane thiosulfonate (Busan 1005, available from Buckman Laboratories Inc.); (2) 2-(thio cyanomethyl thio) benzothiazole (Busan 30WB, 72WB, available from Buckman Laboratories Inc.); (3) methylene bis(thiocyanate) (Metasol T-10, available from Calgon Corporation, AMA-110, available from Vinings Chemical Company, Vichem MBT, available from Vineland Chemical Company, Aldrich 10,509-0); (4) DOWICIL-150, DOWICIL-200 biocide, Dow Chemical Company; (B) cationic biocides, such as (1) cationic poly(oxyethylene (dimethylamino)-ethylene (dimethylamino)ethylene dichloride) (Busan 77, available from Buckman Laboratories Inc.); (2) a cationic blend of methylene bisthiocyanate and dodecyl guanidine hydrochloride (available as SLIME TROL RX-31, RX-32, RX-32P, RX-33, from Betz Paper Chem Inc.

The ink compositions of the present invention can be prepared by various suitable processes. Typically, the inks are prepared by the simple mixing of the ingredients. One process embodiment entails mixing all of the ink ingredients together and filtering the mixture to obtain an ink. Optionally, the mixture obtained after mixing all the ingredients can be heated to a temperature of from about 40° C. to about 55° C. for a suitable period, for example, from about 2 to about 3 hours, subsequently cooling the mixture to room temperature, typically from about 10° C. to about 35° C., and filtering the mixture resulting.

The inks of the present invention are particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, U.S. Pat. No. 4,745,419 and *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers has suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively mixture images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing; (2) matrix configured ejector arrays for matrix printing; and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments, the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Acoustic-loss measurements recited herein were measured as follows samples, about 5 to about 10 grams, of various liquid vehicles were placed between two transducers, with the temperature set at 150° C. The samples were permitted to equilibrate at 150° C. for five minutes. The two transducers were brought together to maximize the acoustic signal, and the amplitude and the position of the signals were recorded. The two transducers were separated by a distance varying from 25.4 microns to 125.4 microns recording each time the amplitude and the position of the signal. Each measurement was performed three times and three samples of the same material were measured. The attenuation dB/mm was then calculated by rationing the amplitude values obtained at different separation distances.

The optical density values of various inks of the present invention are, for example, black 1.3 to 1.5, cyan 1.25 to 1.45, magenta 1.0 to about 1.35 and yellow 1.0 to about 1.15, and which values were obtained on a Pacific Spectrograph Color System. The system consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers (nm). The data terminal features a 12 inch CRT display, numerical keyboard for selection of operating parameters, and the entry of tristimulus values, and an alphanumeric keyboard for entry of product standard information.

The print through values recited herein were obtained on a Pacific Spectrograph Color System. The print through value as characterized by the printing industry is Log base 10 (reflectance of a single sheet of unprinted paper against a black background/reflectance of the back side of a black printed area against a black background) measured at a wavelength of 560 nanometers.

The drying time of images obtained with papers, such as those illustrated hereinafter, is the time for zero image-offset and can be measured as follows: a line comprised of different color sequences is drawn on the ink jet paper using the droplets of inks from the ink jet heads moving from left to right and back. Thereafter, this image is purposely smeared with the pinch roll of the printer by fast forwarding the paper mechanically while the pinch roll is on the top of the imaged line. This entire procedure consumes about two seconds to accomplish. In the event there is no offset of the printed image on the unprinted paper, the drying time of the image is considered as less than two seconds.

The Hercules size values were measured on the Hercules sizing tester (Hercules Incorporated) as described in TAPPI STANDARD T-530 pm-83 issued by the Technical Association of the Pulp and Paper Industry. This method is closely related to the widely used ink flotation test. The TAPPI method has the advantage over the ink flotation test of detecting the end point photometrically. The TAPPI method employs a mildly acidic aqueous dye solution as the penetrating component to permit optical detection of the liquid front as it moves through the paper sheet. The apparatus determines the time required for the reflectance of the sheet surface not in contact with the penetrant to drop to a predetermined (80 percent) percentage of its original reflectance.

Porosity values were measured with a Parker Print-Surf porosimeter which records the volume of air/minutes flowing through a sheet of paper. The edge raggedness values were measured using an Olympus microscope equipped with a camera capable of enlarging the recorded ink jet images, and wherein the edge raggedness value is the distance in millimeters for the intercolor bleed on a checkerboard pattern.

The lightfastness values of the ink jet images of, for example, from about 90 to about 100 percent, and preferably from about 95 to about 100 percent, were measured in the Mark V Lightfast Tester obtained from Microscal Company, London, England; and the waterfastness values of the ink jet images, which can be for example, between about 90 to about 100 percent, and preferably between about 95 to about 100 percent, were obtained from the recorded optical density data and after washing with water at 25° C. for five minutes.

The viscosity values were measured at, for example, from about 25° C. to about 50° C. and preferably at 40° C. using a Haake VT 550 viscosimeter commercially available from FOLIO Incorporated. Advantages of low viscosity inks resides in reduced power consumption by about 35 percent thereby increased printing speed from about 25 pages per minute to about 40 pages per minute, improved jettability resulting in better ink directionality and consequently lower edge raggedness of the prints such as a value of 5 microns, and preferably equal to about, or lower than about 3 microns. The edge raggedness is the deviation of the average width of a line measured from the middle of the line to the edge of the line [also known as mid-frequency line-edge noise (MFLN)] and can be measured with an optical microscope.

The imaged papers exhibit reduced flat curl such as, for example, from about 70 or 90 millimeters for an ink without an anticurl compound to about 5 or 10 millimeters for an ink containing an anticurl compound. Generally, the term "flat curl" refers to the average height of the four corners of a printed paper laying flat on its non imaged side.

The pH of inks were measured with a PHB 357 (Omega Company), pH meter and the preferred pH range is between 6.5 to 8.5 as inks with pH values of between 2.0 and 6.0 and pH values of between 9.0 and 11 react with the present coatings of the printheads.

Specific embodiments of the invention will now be described in detail. These Examples are intended to be illustrative, and the invention is not limited to the materials, conditions, or process parameters set forth in these embodiments. All parts and percentages are by weight of unless otherwise indicated.

EXAMPLE I (Comparative)

Preparation of Inks:

Cyan: 20 Percent by weight of ethylene glycol; 0.25 percent by weight of di(ethyleneglycol)butylether; 0.25 percent by weight of DOWICIL 200 biocide, Dow Chemical Company; 19.3 percent by weight of Projet Cyan 1 dye solution [CI #74190], ICI; 1.95 percent by weight of Acid Blue 9 [CI #42090]; and 58.25 percent by weight of deionized were mixed together and stirred at 250 rpm for a period of 60 minutes at 40° C.; subsequently cooling the mixture resulting to room temperature, about 25° C., and filtering the resulting solution through 0.45 micron size filters. This ink had a viscosity of 1.79 cps, (Centipoise), a surface tension of 56.5 dynes/cm, and a pH of 7.46.

Magenta: 22 percent by weight of ethylene glycol; 0.25 percent by weight of di(ethyleneglycol)butylether; 0.25 percent by weight of DOWICIL 200 biocide, Dow Chemical Company; 7.3 percent by weight of Projet Magenta 1T dye solution [CI #18134], ICI; 7.5 percent by weight of Acid Red 52 dye solution [CI #45100]; 62.7 percent by weight of deionized water were mixed together and stirred at 250 rpm for a period of 60 minutes at 40° C.; subsequently cooling the mixture resulting to room temperature, and filtering the solution obtained through 0.45 micron size filters. This ink had a viscosity of 1.75 cps, a surface tension of 55.5 dynes/cm, and a pH of 6.96.

Yellow: 15.6 percent by weight of ethylene glycol; 0.25 percent by weight of di(ethyleneglycol)butylether; 0.25 percent by weight of DOWICIL 200 biocide, Dow Chemical Company; 32.6 percent by weight of Projet Yellow OAM dye solution, [CI #19140], ICI; 51.3 percent by weight of deionized water were mixed together and stirred at 250 rpm for a period of 60 minutes at 40° C.; subsequently cooling the mixture resulting to room temperature, and filtering the generated solution through 0.45 micron size filters. This ink had a viscosity of 1.80 cps, a surface tension of 56.0 dynes/cm, and a pH of 7.58.

Black: 18.0 percent by weight of ethylene glycol; 5.5 percent by weight of diethylene glycol; 0.27 percent by weight of di(ethyleneglycol)butylether; 0.25 percent by weight of DOWICIL 150 biocide, Dow Chemical Company; 20 percent by weight of Food Black 2 dye solution [CI #27755]; 10.3 percent by weight of Direct Black 19 dye solution [CI #35255]; 45.68 percent by weight of deionized water were mixed and stirred at 250 rpm for a period of 60 at 40° C.; subsequently cooling the mixture to room temperature and filtering the generated solution through 0.45 micron size filters. This ink had a viscosity of 1.78 cps, a surface tension of 56.3 dynes/cm, and a pH 7.78.

Each of the above four inks was incorporated into an acoustic ink jet printer as disclosed in U.S. Pat. No. 4,745, 419 equipped with a carrier for transporting a generally uniformly thick film of hot melt ink across its printhead, together with a heating means for liquefying the ink as it nears the printhead. The droplet ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating. A jetting frequency of 160 MHz was used to generate drops of about 2 picoliters, up to 12 drops per pixel at 600 spi. The resulting images on Xerox 4024™ paper (100 micron in thickness, sizing value of 250 seconds, porosity value of 600 mil/minute), dried in about 30 seconds and had optical density values of 1.40 (black), 1.11 (magenta), 1.35 (cyan), 1.09 (yellow) before washing and 1.12 (black), 0.40 (magenta), 0.51 (cyan), 0.21 (yellow) after washing at 50° C. for two minutes which translates into waterfast values of 80 percent for the black ink, 36 percent for the (magenta) ink, 38 percent for the (cyan) ink, and 19 percent for the (yellow) ink. The optical density of these images after 72 hours in a Mark V Lightfast Tester [equivalent to three months of sunshine] were measured at 1.4 (black), 0.95 (magenta), 1.28 (cyan), and 1.05 (yellow), which translates into lightfast values of 100 percent for the black ink, 95 percent for the (cyan) ink, 86 percent for the (magenta) ink, and 96 percent for the (yellow) ink. The edge raggedness (MFLN) value for black images on yellow background was 6 microns with an inter color bleed value of 23 microns. The paper-curl of all images was measured at greater than 90 millimeters, that is about 93 millimeters (scroll), with a print through value of 0.085.

EXAMPLE II

Preparation of inks:

Cyan: 4 percent by weight of soya amido propyl ethyl dimonium ethyl sulfate, (Schercoquat, SOAS, $M_w$=520, Scher Chemicals); 10 percent by weight of ethylene glycol, (Aldrich #10,246-6); 10 percent by weight of the anticurl compound 1,4-bis(2-hydroxyethoxy)-2-butyne, (Aldrich #B4,470-8); 5 percent by weight of strontium chloride hexahydrate salt, (Aldrich #25,552-1); 2 percent by weight of the antioxidant D-raffinose pentahydrate (Aldrich #20, 667-9); 2 percent by weight of the UV absorber N-(4-ethoxycarbonyl phenyl)-N'-ethyl-N'-phenyl formadine, Givesorb-UV-2, Givaudan Corporation; 0.25 percent by weight of DOWICIL 200 biocide, Dow Chemical Company; and 19.3 percent by weight of Projet Cyan 1 dye [CI #74190], ICI; 1.95 percent by weight of Acid Blue 9 [CI #42090]; and 45.50 percent by weight of deionized water were mixed together and stirred at 250 rpm for a period of 60 minutes at 40° C.; subsequently cooling the resulting mixture to room temperature, and then filtering the resulting solution through 0.45 micron size filters. This ink had a viscosity of 1.9 cps, a surface tension of 37.5 dynes/cm, and a pH 7.56.

Magenta: 4 percent by weight of soya amido propyl ethyl dimonium ethyl sulfate, (Schercoquat, SOAS, $M_w$, =520, Scher Chemicals); 10 percent by weight of ethylene glycol, (Aldrich #10,246-6); 10 percent by weight of anticurl compound 1,4-bis(2-hydroxyethoxy)-2-butyne, (Aldrich #B4, 470-8); 5 percent by weight of strontium chloride hexahydrate salt, (Aldrich #25,552-1); 2 percent by weight of antioxidant D-raffinose pentahydrate (Aldrich #20,667-9); 2 percent by weight of UV absorber N-(4-ethoxycarbonyl phenyl)-N'-ethyl-N'-phenyl formadine, Givesorb-UV-2, Givaudan Corporation; 0.25 percent by weight of DOWICIL 200 biocide, Dow Chemical Company; 8.3 percent by weight of Projet Magenta 1T dye, [CI #18134], ICI; 8.5 percent by weight of Acid Red 52 [CI #45100]; and 49.95 percent by weight of deionized water were mixed together and stirred at 250 rpm for a period of 60 minutes at 40° C.; subsequently cooling the mixture to room temperature, and filtering the resulting solution through 0.45 micron size filters. This ink had a viscosity of 2.05 cps, a surface tension of 38.2 dynes/cm, and a pH of 7.06.

Yellow: 4 percent by weight of soya amido propyl ethyl dimonium ethyl sulfate, (Schercoquat, SOAS, $M_w$, =520, Scher Chemicals); 10 percent by weight of ethylene glycol, (Aldrich #10,246-6); 10 percent by weight of the anticurl compound 1,4-bis(2-hydroxyethoxy)-2-butyne, (Aldrich #B4,470-8); 5 percent by weight of strontium chloride hexahydrate salt, (Aldrich #25,552-1); 2 percent by weight of antioxidant D-raffinose pentahydrate (Aldrich #20,667-9); 2 percent by weight of UV absorber N-(4-ethoxycarbonyl phenyl)-N'-ethyl-N'-phenyl formadine, Givesorb-UV-2, Givaudan Corporation; 0.25 percent by weight of DOWICIL 200 biocide, Dow Chemical Company; 29.8 percent by weight of Projet Yellow OAM dye solution, [CI #19140]; and 36.95 percent by weight of deionized water were mixed together and stirred at 250 rpm for a period of 60 minutes at 40° C.; subsequently cooling the mixture to room temperature, about 25° C., and filtering the solution through 0.45 micron size filters. This ink had a viscosity of 2.05 cps, a surface tension of 37.0. dynes/cm, and a pH of 7.16.

Black: 4 percent by weight of soya amido propyl ethyl dimonium ethyl sulfate, (Schercoquat, SOAS, $M_w$=520, Scher Chemicals); 10 percent by weight of ethylene glycol, (Aldrich #10,246-6); 6 percent by weight of diethylene glycol; 10 percent by weight of the anticurl compound 1,4-bis(2-hydroxyethoxy)-2-butyne, (Aldrich #B4,470-8); 5 percent by weight of strontium chloride hexahydrate salt, (Aldrich #25,552-1); 2 percent by weight of antioxidant D-raffinose pentahydrate (Aldrich #20,667-9); 2 percent by weight of UV absorber N-(4-ethoxycarbonyl phenyl)-N'-ethyl-N'-phenyl formadine, Givesorb-UV-2, Givaudan Corporation; 0.25 percent by weight of DOWICIL 200 biocide, Dow Chemical Company; 19.3 percent by weight of Food Black 2 dye, [CI #27755]; 10.5 percent by weight of Direct Black 19 [CI #35255]; and 30.95 percent by weight of deionized water were mixed together and stirred at 250 rpm for a period of 60 minutes at 40° C.; subsequently cooling the mixture to room temperature, and filtering the resulting solution through 0.45 micron size filters. This ink had a viscosity of 2.03 cps, a surface tension of 37.3 dynes/cm, and a pH of 7.36.

Each of the above four inks was incorporated into an acoustic ink jet printer, and a jetting frequency of 160 MHz was used to generate drops of about 2 picoliters, up to 12 drops per pixel at 600 spi. The resulting images on Xerox 4024™ paper (100 micron in thickness, sizing value of 250 seconds, porosity value of 600 mil/minute), dried in 3 seconds and had optical density values of 1.40 (black), 1.15 (magenta), 1.35 (cyan), 1.10 (yellow) before washing and 1.33 (black), 1.06 (magenta), 1.11 (cyan), 1.04 (yellow) after washing at 50° C. for two minutes, which translates into waterfastness values of 95 percent for the black ink, 92 percent for the (magenta) ink, 82 percent for the (cyan) ink, and 95 percent for the (yellow) ink. The optical density of these images after 72 hours in a Mark V Lightfast Tester [equivalent to three months of sunshine] were measured at 1.40 (black), 1.09 (magenta), 1.28 (cyan) and 1.07 (yellow), which translates into lightfastness values of 100 percent for the black ink, 95 percent for the (magenta) ink, 95 percent for the (cyan) ink, and 97 percent for the (yellow) ink. The edge raggedness (MFLN) value for black images on yellow background was 5 microns with an inter color bleed value of 7 microns. The edge raggedness is the deviation of the average width of a line measured from the middle of the line to the edge of the line (also known as mid-frequency line-edge noise (MFLN)) and can be measured with an optical microscope. The flat paper-curl of all images was measured at about 9 millimeters (black), 8 millimeters (cyan), 9 millimeters (magenta), and 7 millimeters (yellow) with a print through value for black at 0.105. Flat curl refers to the average height of the four corners of a printed paper laying flat on its non imaged side. The print through value as characterized by the printing industry is Log base 10 (reflectance of a single sheet of unprinted paper against a black background/reflectance of the back side of a black printed area against a black background) measured at a wavelength of 560 nanometers.

The resulting images on paper with the inks of Example II dried in 3 seconds compared to 30 seconds for the Comparative Example inks. The invention inks have equivalent optical density values of 1.40 (black), 1.15 (magenta), 1.35 (cyan), 1.10 (yellow) compared to values of 1.40 (black), 1.11 (magenta), 1.35 (cyan), 1.09 (yellow) for the comparative inks of Example I. The waterfast values of the invention inks in Example II are higher with values of 95 percent for the black ink, 92 percent for the (magenta) ink, 82 percent for the (cyan) ink, and 92 percent for the (yellow) ink compared to values of 80 percent for the black ink, 36 percent for the (magenta) ink, 38 percent for the (cyan) ink, and 19 percent for the (yellow) ink for the comparative inks Example I. The lightfast values of the images were 100 percent for the black ink, 95 percent for the (magenta) ink, 95 percent for the (cyan) ink, and 97 percent for the (yellow) ink compared to values of 100 percent for the black ink, 95 percent for the (cyan) ink, 86 percent for the (magenta) ink, and 96 percent for the (yellow) ink for the comparative inks of Example I. The lightfastness values of the comparative magenta increased from 86 percent to 95 percent for the invention ink. The edge raggedness (MFLN) value for black images on yellow background was lower at 7 microns with an inter color bleed value of only 7 microns for the invention inks, compared to a higher edge raggedness (MFLN) value 6 microns with unacceptable higher inter color bleed value of 23 microns for the images of the comparative inks of Example I. The paper-curl of all images for the invention inks was measured at about 9 millimeters (black), 8 millimeters (cyan), 9 millimeters (magenta), and 7 millimeters (yellow), whereas for the Example comparative inks, the paper-curl of all comparative images was unacceptable and measured at greater than 90 millimeters (scroll). The print through value for the higher surface tension black inks of the comparative inks in Example I was lower at 0.85 compared with the invention black inks in Example II, which had a print through value of 0.105.

EXAMPLE III (Comparative)

Preparation of Inks:

Cyan: 10 percent by weight of tetramethylene sulfone, (Aldrich #T2,220-9); 8 percent by weight of 2,2'-thiodiethanol, (Aldrich #16,678-2); 0.25 percent by weight of di(ethyleneglycol)butylether (Aldrich #11,031-0); 0.25 percent by weight of DOWICIL 200 biocide, Dow Chemical Company; 4 percent by weight of diethyl diallyl ammonium bromide; 2 percent by weight of potassium iodide (Aldrich #22,194-5); 0.5 percent by weight of the buffer tris (hydroxymethyl) aminomethane, (Aldrich #22,194-5); 2.4 percent by weight of Acid Blue 9 [CI #42090]; and 72.6 percent by weight of deionized water were mixed together and stirred at 250 rpm for a period of 60 minutes at 40° C.; subsequently cooling the mixture to room temperature, and filtering the resulting solution through 0.45 micron size filters. This ink had a viscosity of 1.90 cps, a surface tension of 49.5 dynes/cm, and a pH of 8.12.

Magenta: 10 percent by weight of tetramethylene sulfone, (Aldrich #T2,220-9); 8 percent by weight of 2,2'-thiodiethanol, (Aldrich #16,678-2); 0.25 percent by weight of di(ethyleneglycol)butylether (Aldrich #11,031-0); 0.25 percent by weight of DOWICIL 200 biocide, Dow Chemical Company; 4 percent by weight of diethyl diallyl ammonium bromide; 2.5 percent by weight of potassium iodide (Aldrich #22,194-5); 0.5 percent by weight of the buffer tris (hydroxymethyl) aminomethane, (Aldrich #22,194-5); 13 percent by weight of Projet Magenta 3BOA dye solution [CI #18134], ICI; 13 percent by weight of Acid Red 52 dye solution [CI #45100]; and 48.5 percent by weight of deionized water were mixed together and stirred at 250 rpm for a period of 60 minutes at 40° C.; subsequently cooling the mixture to room temperature, about 25° C., and filtering the solution through 0.45 micron size filters. This ink had a viscosity of 1.93 cps, a surface tension of 49.5 dynes/cm, and a pH of 8.12.

Yellow: 5 percent by weight of tetramethylene sulfone, (Aldrich #T2,220-9); 8 percent by weight of 2,2'-thiodiethanol, (Aldrich #16,678-2); 0.25 percent by weight of di(ethyleneglycol)butylether (Aldrich #11,031-0); 0.25 percent by weight of DOWICIL 200 biocide, Dow Chemical Company; 4 percent by weight of diethyl diallyl ammonium bromide; 0.5 percent by weight of buffer tris (hydroxymethyl)aminomethane, (Aldrich #22,194-5); 45 percent by weight of Projet Yellow OAM dye solution, [CI #19140]; and 37.0 percent by weight of deionized water were mixed together and stirred at 250 rpm for a period of 60 minutes at 40° C.; subsequently cooling the mixture to room temperature, and filtering the solution through 0.45 micron size filters. This ink had a viscosity of 1.89 cps, a surface tension of 56 dynes/cm, and a pH of 8.11.

Black: 10 percent by weight of tetramethylene sulfone, (Aldrich #T2,220-9); 8 percent by weight of 2,2'-thiodiethanol, (Aldrich #16,678-2); 0.25 percent by weight of di(ethyleneglycol)butylether (Aldrich #11,031-0); 0.25 percent by weight of DOWICIL 200 biocide, Dow Chemical Company; 4 percent by weight of diethyl diallyl ammonium bromide; 2.5 percent by weight of potassium iodide (Aldrich #22,194-5); 0.5 percent by weight of the buffer tris (hydroxymethyl) aminomethane, (Aldrich #22,194-5); 21 percent by weight of Food Black 2 dye solution [CI #27755]; 10.5 percent by weight of Direct Black 19 dye solution [CI #35255]; and 43.0 percent by weight of deionized water were mixed together and stirred at 250 rpm for a period of 60 minutes at 40° C.; subsequently cooling the mixture to room temperature, and filtering the resulting solution through 0.45 micron size filters. This ink had a viscosity of 1.95 cps, a surface tension of 53.5 dynes/cm, and a pH of 8.12.

Each of the above four inks was incorporated into an acoustic ink jet printer. A jetting frequency of 160 MHz was used to generate drops of about 2 picoliters, up to 12 drops per pixel at 600 spi. The resulting images on Xerox 4024™ paper (100 micron in thickness, sizing value of 250 seconds, porosity value of 600 mil/minute), dried in about 30 seconds and had optical density values of 1.45 (black), 1.26 (magenta), 1.40 (cyan), 1.12 (yellow) before washing and 1.16 (black), 0.50 (magenta), 0.53 (cyan) 0.28 (yellow) after washing at 50° C. for two minutes, which translates into waterfast values of 80 percent for the black ink, 40 percent for the magenta ink, 38 percent for the (cyan) ink, and 25 percent for the (yellow) ink. The optical density of these images after 72 hours in a Mark V Lightfast Tester (equivalent to three months of sunshine) were measured at 1.45 (black), 1.26 (magenta), 1.32 (cyan) and 1.04 (yellow), which translates into lightfast values of 100 percent for the black ink, 100 percent for the (magenta) ink, 94 percent for the (cyan) ink, and 93 percent for the (yellow) ink. The edge raggedness (MFLN) value for black images on yellow background was 6.5 microns with an inter color bleed value of 28 microns. The paper-curl of all images was measured at 25 millimeters (black), 18 millimeters (cyan), 19 millimeters (Magenta), and 13 millimeters (yellow). The print through value for the higher surface tension black comparative inks in Example III was 0.060.

EXAMPLE IV

Preparation of Inks:

Cyan: 2 percent by weight of dodecyltriphenyl phosphonium bromide ($M_w$=511) (Aldrich 17,262-6); 10 percent by weight of tetramethylene sulfone, (Aldrich #T2,220-9); 10 percent by weight of the anticurl compound pantothenol, (Aldrich #29,578-7); 5 percent by weight of magnesium nitrate hexahydrate, (Aldrich #23,717-5); 2 percent by weight of antioxidant D-raffinose pentahydrate (Aldrich #20,667-9); 2 percent by weight of UV absorber N-(4 ethoxycarbonyl phenyl)-N'-ethyl-N'-phenyl formadine, Givesorb-UV-2, Givaudan Corporation; 0.25 percent by weight of DOWICIL 150 biocide, Dow Chemical Company, Midland, Mich.; 19.5 percent by weight of Projet Cyan 1 dye, ICI; 1.95 percent by weight of Acid Blue 9 [CI #42090]; and 47.3 percent by weight of deionized water were mixed together and stirred at 250 rpm for a period of 60 minutes at 40° C., subsequently cooling the mixture to room temperature, and filtering the solution resulting through 0.45 micron size filters. This ink had a viscosity of 2.05 cps, a surface tension 36.5 dynes/cm, and a pH of 7.66.

Magenta: 4 percent by weight of isostearyl ethylimidonium ethyl sulfate [$M_w$520], (Monaquat-ISIES, Mona Industries); 10 percent by weight of tetramethylene sulfone, (Aldrich #T2,220-9); 10 percent by weight of the anticurl compound pantothenol, (Aldrich #29,578-7); 5 percent by weight of magnesium nitrate hexahydrate, (Aldrich #23,717-5); 2 percent by weight of antioxidant D-raffinose pentahydrate (Aldrich #20,667-9); 2 percent by weight of the lightfastness UV absorber N-(4-ethoxycarbonyl phenyl)-N'-ethyl-N'-phenyl formadine, Givesorb-UV-2, Givaudan Corporation; 0.25 percent by weight of DOWICIL 150 biocide, Dow Chemical Company, Midland, Mich.; 8.5 percent by weight of Projet Magenta 1T dye solution [CI #18134], ICI; 8.5 percent by weight of Acid Red 52 dye solution [CI #45100]; and 49.75 percent by weight of deionized water were mixed together and stirred at 250 rpm for a period of 60 minutes at 40° C.; subsequently cooling the mixture resulting to room temperature, and filtering the solution through 0.45 micron size filters. This ink had a viscosity of 2.10 cps, surface tension of 35.5 dynes/cm, and a pH of 7.16.

Yellow: 4 percent by weight of methyl bis(oleyl amido ethyl)2-hydroxyethyl ammonium methyl sulfate (Varisoft 222-LT, $M_w$=860; from Sherex Chemicals); 10 percent by weight of tetramethylene sulfone, (Aldrich #T2,220-9); 10 percent by weight of the anticurl compound pantothenol, (Aldrich #29,578-7); 5 percent by weight of magnesium nitrate hexahydrate, (Aldrich #23,717-5); 2 percent by weight of antioxidant D-raffinose pentahydrate (Aldrich #20,667-9); 2 percent by weight of UV absorber N-(4-ethoxycarbonyl phenyl)-N'-ethyl-N'-phenyl formadine, Givesorb-UV-2, Givaudan Corporation; 0.25 percent by weight of DOWICIL 150 biocide, Dow Chemical Company, Midland, Mich.; 30 percent by weight of Projet Yellow OAM dye solution [CI #19140], and 36.75 percent by weight of deionized water were mixed together and stirred at 250 rpm for a period of 60 minutes at 40° C.; subsequently cooling the mixture to room temperature, and filtering the solution generated through 0.45 micron size filters. This ink had a viscosity of 2.05 cps, (at 25° C. throughout the Examples), a surface tension of 37.5 dynes/cm, and a pH of 7.16.

Black: 4 percent by weight of isostearyl ethylimidonium ethyl sulfate, (Monaquat-ISIES, $M_w$, =520, Mona Industries); 10 percent by weight of tetramethylene sulfone, (Aldrich #T2,220-9); 10 percent by weight of the anticurl compound pantothenol, (Aldrich #29,578-7); 5 percent by weight of magnesium nitrate hexahydrate, (Aldrich #23,717-5); 2 percent by weight of the antioxidant D-raffinose pentahydrate (Aldrich #20,667-9); 2 percent by weight of UV absorber N-(4-ethoxycarbonyl phenyl)-N'-ethyl-N'-phenyl formadine, Givesorb-UV-2, Givaudan Corporation; 0.25 percent by weight of DOWICIL 150 biocide, Dow Chemical Company, Midland, Mich.; 19.5 percent by weight of Food Black 2 dye solution [CI #27755]; 10.5 percent by weight of Direct Black 19 dye solution [CI #35255] and 36.75 percent by weight of deionized water were mixed together and stirred at 250 rpm for a period of 60 minutes at 40° C.; subsequently cooling the mixture to room temperature, and filtering the generated solution through 0.45 micron size filters. This ink had a viscosity of 2.13 cps, a surface tension of 37 dynes/cm, and a pH of 7.26.

Each of the above four inks was incorporated into an acoustic ink jet printer. A jetting frequency of 160 MHz was used to generate drops of about 2 picoliters, up to 12 drops per pixel at 600 spi. The resulting images on Xerox 4024™ paper (100 micron in thickness, sizing value of 250 seconds, porosity value of 600 mil/minute), dried in 4 seconds and had optical density values of 1.45 (black), 1.30 (magenta), 1.40 (cyan), 1.15 (yellow) before washing and 1.38 (black), 1.22 (magenta), 1.23 (cyan), 1.04 (yellow) after washing at 50° C. for two minutes which translates into waterfast values of 95 percent for the black ink, 94 percent for the magenta ink, 88 percent for the (cyan) ink, and 90 percent for the (yellow) ink. The optical density of these images after 72 hours in a Mark V Lightfast Tester (equivalent to three months of sunshine) were measured at 1.45 (black), 1.30 (magenta), 1.26 (cyan), and 1.09 (yellow), which translates into lightfast values of 100 percent for the black ink, 100 percent for the (magenta) ink, 95 percent for the (cyan) ink, and 95 percent for the (yellow) ink. The edge raggedness (MFLN) value for black images on yellow background was 4 microns with an inter color bleed value of 8 microns. The paper-curl of all images was measured at 7 millimeters (black), 6 millimeters (cyan), 8 millimeters (magenta), and 6 millimeters (yellow) with a print through value of 0.110.

The resulting images on paper with the inks of the present invention described in Example IV, dried in 4 seconds compared to 30 seconds for the comparative ink of Example III. The invention inks of Example IV have equivalent optical density values of 1.45 (black), 1.30 (magenta), 1.40 (cyan), 1.15 (yellow) compared to values of optical density values of 1.45 (black), 1.26 (magenta), 1.40 (cyan), 1.12 (yellow) for the comparative inks of Example III. The waterfast values of the invention inks in Example IV are higher with values of 95 percent for the black ink, 94 percent for the magenta ink, 88 percent for the (cyan) ink, and 90 percent for the (yellow) ink compared to values of values of 80 percent for the black ink, 40 percent for the magenta ink, 38 percent for the (cyan) ink, and 25 percent for the (yellow) ink for the comparative inks of Example III. The lightfast values of images produced by the invention inks have slightly improved values of 100 percent for the black ink, 100 percent for the (magenta) ink, 95 percent for the (cyan) ink, and 95 percent for the (yellow) ink compared to values of 100 percent for the black ink, 100 percent for the (magenta) ink, 94 percent for the (cyan) ink, and 93 percent for the (yellow) ink for the comparative inks of Example III. The edge raggedness (MFLN) value for black images on yellow background was lower at 4 microns with an inter color bleed value of only 8 microns for the invention inks, compared to a higher edge raggedness (MFLN) value 6.5 microns with unacceptable higher inter color bleed value of 28 microns for the images of the comparative inks of Example III. The paper-curl of all images for the invention inks was lower and had values of 7 millimeters (black), 6 millimeters (cyan), 8 millimeters (magenta), and 6 millimeters (yellow), whereas for the comparative inks the paper-curl of all comparative images was measured at 25 millimeters (black), 18 millimeters (cyan), 19 millimeters (magenta), and 13 millimeters (yellow). The print through value for the higher surface tension black comparative inks in Example III was lower at 0.060 compared with the invention black inks in Example IV which had a print through value of 0.110.

EXAMPLE V (Comparative)

Yellow: 4 percent by weight of tetrabutyl ammonium bromide, (Aldrich #19,311-9); 10 percent by weight of ethylene glycol, (Aldrich #10,246-6); 10 percent by weight of anticurl agent 3,3'-thiodipropanol (Aldrich #16,678-2); 5 percent by weight of strontium chloride hexahydrate salt, (Aldrich #25,552-1); 2 percent by weight of the antioxidant D-raffinose pentahydrate (Aldrich #20,6679); 2 percent by weight of the UV absorber N-(4-ethoxycarbonyl phenyl)-N'-ethyl-N'-phenyl formadine, Givesorb-UV-2, Givaudan Corporation; 0.25 percent by weight of DOWICIL 200 biocide, Dow Chemical Company; 29.8 percent by weight of Projet Yellow OAM dye solution, [CI #19,140]; and 36.95 percent by weight of deionized water were mixed together and stirred at 250 rpm for a period of 60 minutes at 40° C.; subsequently cooling the mixture to room temperature, and filtering the solution generated through 0.45 micron size filters. This ink had a viscosity of 2.10 cps, a surface tension 54 dynes/cm, and a pH of 7.20. This ink was incorporated into an acoustic ink jet printer. A jetting frequency of 160 MHz was used to generate drops of about 2 picoliters, up to 12 drops per pixel at 600 spi. The resulting images on Xerox 4024™ paper (100 micron in thickness, sizing value of 250 seconds, porosity value of 600 mil/minute), with the inks prepared by replacing dye fixative materials of the present invention soya amido propyl ethyl dimonium ethyl sulfate of Example II and of methyl bis(oleyl amido ethyl)2-hydroxyethyl ammonium methyl sulfate of Example IV, by the comparative material tetrabutyl ammonium bromide of the U.S. Pat. No. 3,985,663, had an optical density value of 1.10 (yellow) before washing and 0.55 after washing with water for 5 minutes at 25° C., which translates into waterfast values of 50 percent for the yellow ink. This value is lower than the waterfast value of 96 percent for the yellow inks in Example II and 95 percent for the yellow inks in Example IV.

EXAMPLE VI (Comparative)

Yellow: 1 percent by weight of tetraheptyl ammonium bromide, (maximum solubility in ink) (Aldrich #23,784-1); 10 percent by weight of ethylene glycol, (Aldrich #10,246-6); 10 percent by weight of the anticurl agent 3,3'-thiodipropanol(Aldrich #16,678-2); 5 percent by weight of strontium chloride hexahydrate salt, (Aldrich #25,552-1); 2 percent by weight of antioxidant D-raffinose pentahydrate (Aldrich #20,667-9); 2 percent by weight of the UV absorber N-(4-ethoxycarbonyl phenyl)-N'-ethyl-N'-phenyl formadine, Givesorb-UV-2, Givaudan Corporation; 0.25 percent by weight of DOWICIL 200 biocide, Dow Chemical Company; 29.8 percent by weight of Projet Yellow OAM dye solution, [CI #19,140]; and 39.95 percent by weight of deionized water were mixed together and stirred at 250 rpm for a period of 60 minutes at 40° C.; subsequently cooling the mixture to room temperature, and filtering the generated solution through 0.45 micron size filters. This ink had a viscosity of 2.0 cps, a surface tension of 52 dynes/cm, and a pH of 7.25. This ink was incorporated into an acoustic ink jet printer. A jetting frequency of 160 MHz was used to generate drops of about 2 picoliters, up to 12 drops per pixel at 600 spi. The resulting images on Xerox 4024™ paper (100 micron in thickness, sizing value of 250 seconds, porosity value of 600 mil/minute), with the inks made by replacing dye fixative materials of the present invention soya amido propyl ethyl dimonium ethyl sulfate of Example II and of methyl bis(oleyl amido ethyl) 2-hydroxyethyl ammonium methyl sulfate of Example IV, by the comparative material tetraheptyl ammonium bromide of the U.S. Pat. No. 3,985,663, had optical density value of 1.08 (yellow) before washing and 0.54 after washing with water for 5 minutes at 25° C., which translates into waterfast values of 50 percent for the yellow ink. This value is lower than the waterfast value of 96 percent for the yellow inks in Example II and 95 percent for the yellow inks in Example IV.

EXAMPLE VI (Comparative)

Black: 1.3 percent by weight of cetyl pyridinium chloride monohydrate, [maximum solubility in ink] (Aldrich #85, 556-1); 10 percent by weight of ethylene glycol, (Aldrich #10,246-6); 6 percent by weight of diethylene glycol; 10 percent by weight of anticurl compound 1,4-bis(2-hydroxyethoxy)-2-butyne, (Aldrich #B4,470-8); 5 percent by weight of strontium chloride hexahydrate salt, (Aldrich #25,552-1); 2 percent by weight of the antioxidant D-raffinose pentahydrate (Aldrich 20,667-9); 2 percent by weight of UV absorber N-(4-ethoxycarbonyl phenyl)-N'-ethyl-N'-phenyl formadine, Givesorb-UV-2, Givaudan Corporation; 0.25 percent by weight of DOWICIL 200 biocide, Dow Chemical Company; 19.3 percent by weight of Food Black 2 dye, [CI #27755]; 10.3 percent by weight of Direct Black 19[CI #35255]; and 33.85 percent by weight of deionized water were mixed. This ink had a viscosity of 2.13 cps, a surface tension 36.5 dynes/cm, and a pH of 7.46. This ink was incorporated into an acoustic ink jet printer. A jetting frequency of 160 MHz was used to generate drops of about 2 picoliters, up to 12 drops per pixel at 600 spi. The resulting images on Xerox 4024™ paper (100 micron in thickness, sizing value of 250 seconds, porosity value of 600 mil/minute), with the inks made by replacing dye fixative materials of the present invention soya amido propyl ethyl dimonium ethyl sulfate of Example II and isostearyl ethylimidonium ethyl sulfate of Example IV, by cetyl pyridinium chloride monohydrate comparative material of the U.S. Pat. No. 5,382,492, had optical density value of 1.38. (black) before washing and 1.17 after washing with water for 5 minutes at 25° C., which translates into waterfast values of 85 percent for the black ink. This waterfast value of 85 percent is lower than the waterfast value of 95 percent for the black inks in Example II and 95 percent for the black inks in Example IV.

Unlike the slow drying high surface tension inks (surface tension between 45 to 60 dynes/cm) which have the tendency to remain on the surface of paper, the fast drying aqueous surface tension between for example, about 25 to about 44 dynes/cm) generally have a tendency to penetrate into paper and that may result in unacceptable show through of images. However, the small ink-dot size (2.2 picoliter droplets) of the acoustic ink jet printing processes have an advantage over thermal ink jet processes which employ bigger ink-drops (from about 8 to about 50 picoliter) to producing images with minimum show through (also referred to as printthrough). Furthermore, the waterfast additives such as soya amido propyl ethyl dimonium ethyl sulfate and isostearyl ethylimidonium ethyl sulfate present in the inks of the invention retain a major portion of the ink on the surface of paper thereby reducing print-through.

A number of papers may be selected for receiving images and developing images thereon with the inks illustrated herein, examples of these papers being as follows. Office papers which are comprised of sized blends of hardwood kraft and softwood kraft fibers which blends contain from about 10 percent to 90 percent by weight of soft wood and from about 90 to about 10 percent by weight of hardwood. Examples of hardwood include Seagull W dry bleached hardwood kraft preferably present, for example, in an amount of 70 percent by weight of. Examples of softwood include La Tuque dry bleached softwood kraft present, for example, in an amount of 30 percent by weight. Office papers are often sized with sizing components for the purpose of retarding or preventing penetration of liquids into the structure. This is commonly done by introducing a material into the pulp during the paper making operation. These sized papers may also contain fillers and pigments in effective amounts of from about 1 to about 60 percent by weight of such as clay (available from Georgia Kaolin Company, Astro-fil 90 clay, Engelhard Ansilex lay), titanium dioxide (available from Tioxide Company—Anatase grade AHR), calcium silicate CH-427-97-8, XP-974 (J.M. Huber Corporation), and the like. Also, the sized papers may contain various effective amounts of sizing chemicals (for example, from about 0.25 percent to about 25 percent by weight of pulp) such as Mon size (available from Monsanto Company), Hercon-76 (available from Hercules Company), Alum (available from Allied Chemicals as Iron free alum), and retention aid (available from Allied Colloids as Percol 292). The sizing values of these papers vary between about 0.4 second to about 4,685 seconds, however, papers in the sizing range of 50 seconds to 300 seconds are preferred, primarily to decrease costs. The porosity values of the papers which are preferably porous varies from about 100 to about 1,260 mil/minute and preferably from about 100 to about 600 mil/minute to permit, for example, the use of these papers for various printing technologies such as ink jet processes, liquid toner development, xerography, and the like.

Illustrative examples of commercially available, internally and externally (surface) sized substrates that may be selected for the present invention and are treated with a desizing compound dispersed in an optional binder with a thickness of, for example, from about 50 microns to about 200 microns, and preferably of a thickness of from about 100 microns to about 125 microns that may be selected for the aforementioned papers include: Diazo papers, offset papers such as Great Lakes offset, recycled papers such as Conservatree, office papers such as Automimeo, Eddy liquid toner paper and copy papers from companies such as Xerox Corporation, Nekoosa, Champion, Wiggins Teape, Kymmene, Modo, Domtar, Veitsiluoto and Sanyo with Xerox 4024™ papers and sized calcium silicate-clay filled papers being particularly preferred in view of their availability, reliability, and low print through.

Generally, the term "flat curl" refers to the average height of the four corners of a printed paper laying flat on its nonimaged side.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) a quaternary compound selected from the group consisting of (a) imidazolinium quaternary salts, (b) phosphonium quaternary salts, and (c) ammonium quaternary salts; (2) a liquid ink vehicle; (3) an optional paper-curl reducing compound; (4) a lightfastness component; (5) a lightfastness antioxidant; (6) a substantially water soluble organic salt or a substantially water soluble inorganic salt; (7) a biocide; and (8) a colorant.

2. An ink in accordance with claim 1 and which ink possesses a surface tension of from about 25 to about 44 dynes/cm at a temperature of from about 100° C. to about 165° C., and a pH of from about 6.5 to about 8.5.

3. An ink composition in accordance with claim 1 wherein said quaternary compound has an average molecular weight $M_w$ of from about 105 to about 995.

4. An ink composition in accordance with claim 1 wherein said quaternary compound has an average molecular weight $M_w$ of from about 450 to about 995.

5. An ink composition in accordance with claim 1 wherein the quaternary compound is present in an amount of from about 1 to about 15 percent by weight, the ink vehicle is present in an amount of from about 69 to about 5 percent by weight, the paper-curl reducing component, or anticurl compound is present in an amount of from about 28 to about 5 percent by weight, the lightfastness component is present in an amount of from about 0.25 to about 5 percent by weight, the antioxidant is present in an amount of from about 0.25 to about 5 percent by weight, the colorant is present in an amount of from about 0.5 to about 10 percent by weight, the soluble salt is present in an amount of from about 0.25 to about 10 percent by weight, the biocide is present in an amount of from about 0.25 to about 1 percent by weight, and wherein the total of all ink components is about 100 percent.

6. An ink composition in accordance with claim 1 wherein the imidazolinium quaternary compound is present in an amount of from about 1 to about 15 percent by weight and is selected from the group consisting of (1) 1-tallow amido ethyl-3-methyl-2-heptadecylimidazolinium methyl sulfate; (2) methyl-1-tallow amido ethyl-2-tallow imidazolinium methyl sulfate; (3) methyl-1-hydrogenated tallow amido ethyl-2-hydrogenated tallow imidazolinium methyl sulfate; (4) 1-methyl-1-oleyl amido ethyl-2-oleyl-imidazolinium methyl sulfate; (5) isostearyl ethylimidonium ethyl sulfate; and (6) isostearyl benzylimidonium chloride.

7. An ink composition in accordance with claim 1 wherein the phosphonium quaternary compound is present in an amount of from about 1 to about 15 percent by weight and is selected from the group consisting of (1) hexadecyl tributyl phosphonium bromide; (2) stearyl tributyl phosphonium bromide; (3) dodecyl triphenyl phosphonium bromide; (4) hexyl triphenyl phosphonium bromide; (5) benzyl triphenyl phosphonium chloride; (6) (4-ethoxybenzyl)triphenyl phosphonium bromide; (7) 4-butoxybenzyl triphenyl phosphonium bromide; (8) 2-(1,3-dioxan-2-yl)ethyl]triphenyl phosphonium bromide; (9) (2-hydroxybenzyl) triphenyl phosphonium bromide; and (10) tetra phenyl phosphonium chloride.

8. An ink composition in accordance with claim 1 wherein the ammonium quaternary salt is present in an amount of from about 1 to about 15 percent by weight and is selected from the group consisting of dialkyl substituted ammonium salts of (1) 1-propanaminium 2,3-dihydroxy-N-dimethyl-N-[3(oxococoyl) amino]propyl]-chloride; (2) dodecanoyl-N-methyl amino ethyl-(phenyl carbamyl methyl)dimethyl ammonium chloride; (3) dihydrogenated tallow dimethyl ammonium methyl sulfate; (4) dihydrogenated tallow dimethyl ammonium chloride; (5) dibehenyl/diarachidyl dimethyl ammonium chloride; (5) soya amido propyl benzyl dimonium chloride; (6) soya amido propyl ethyl dimonium ethyl sulfate; (7) gluconamidopropyl dimethyl-2-hydroxyethyl ammonium chloride; (8) minkamidopropyl dimethyl-2-hydroxyethyl ammonium chloride; (9) N-rapeseed-(3-amidopropyl)-N-N-dimethyl-N-(2,3 epoxy propyl) ammonium chloride; (10) N-safflower-(3-amidopropyl)-N-N-dimethyl-N-ethyl ammonium ethyl sulfate; (11) rapeseed amido propyl ethyl dimonium chloride; and (12) 2-hydroxypropyl-bis-1,3-(N-isostearyl amido propyl-N,N-dimethyl ammonium chloride).

9. An ink composition in accordance with claim 1 wherein the ammonium quaternary salt is present in an amount of from about 1 to about 15 percent by weight and is selected from the group consisting of (1) tridecyloxypropyl dihydroxy ethyl methyl ammonium chloride; (2) methyl bis(2-hydroxy ethyl)coco ammonium chloride; (3) [2-(2-carboxy ethoxy) ethyl]2-(2-hydroxy)ethoxy)ethyl]methyl dodecyl ammonium methyl sulfate; (4) [2-(2-carboxy ethoxy)ethyl] [2-(2-hydroxy)ethoxy ethyl]methyl octadecyl ammonium methyl sulfate; (5) N-tetradecyl dimethyl-naphthyl methyl ammonium chloride; (6) octadecyl diethanol methyl ammonium chloride; (7) octadecyl dihydroxy ethyl methyl ammonium chloride; (8) bis[(ethyl tallowate)]-2-hydroxyethyl methyl ammonium methyl sulfate; (9) ditallow amido ammonium methyl sulfate; (10) bis hydroxyethyl dihydroxypropyl stearaminium chloride; (11) methyl bis(oleyl amido ethyl)2-hydroxyethyl ammonium methyl sulfate; (12) methyl bis(soya amido ethyl), 2-hydroxyethyl ammonium methyl sulfate; and (13) methyl bis(tallow amido ethyl)2-hydroxy propylammonium methyl sulfate.

10. An ink composition in accordance with claim 1 wherein the ink vehicle is present in an amount of from about 5 to about 70 percent by weight and wherein said vehicle is selected from the group consisting of (1) 2-pyrrolidinone; (2) 1-pyrrolidino-1-cyclohexene; (3) 2,2'-bithiophene; (4) 1-cyclohexyl-2-pyrrolidinone; (5) 1-octyl-2-pyrrolidinone; (6) 1,4-cyclohexanedimethanol; (7) 1-decyl-2-methyl-imidazole; (8) ethyleneglycol; (9) propylene carbonate; (10) tetramethylene sulfone; (11) 2,2'-thiodiethanol; (12) 2,2'-sulfonyldiethanol; (13) di(ethylene glycol); (14) di(ethylene glycol) butylether; and (15) diethylene glycol dibutylether.

11. An ink composition in accordance with claim 1 wherein the paper curl reducing compound is present in the ink composition in an amount of from about 28 to about 5 percent by weight and is selected from the group consisting of (1) pentaerythritol propoxylate/ethoxylate; (2) triethanolamine ethoxylate; (3) 1,4-bis(2-hydroxy ethoxy)-2-butyne; (4) pantothenol; (5) 3-octadecyloxy-1,2-propanediol; (6) 3-(4-methoxy phenoxy)-1,2-propanediol; (7) 3-pyrrolidino-1,2-propanediol; (8) 3-piperidino-1,2-propanediol; (9) 3-morpholino-1,2-propanediol; and (10) 4-8-bis (hydroxymethyl) tricyclo [5.2.1.02.6] decane.

12. An ink composition in accordance with claim 1 wherein the lightfastness component is present in an amount of from about 0.25 to about 5 percent by weight and is selected from the group consisting of (1) N-(4-ethoxycarbonyl phenyl)-N'-ethyl-N'-phenyl formadine; (2) poly(4-hydroxy-2,2,6,6-tetramethyl-1-piperidine ethanol/dimethyl succinic acid); (3) poly[N,N-bis(2,2,6,6- tetramethyl-4-piperidinyl)-1,6-hexane-diamine-co-2,4-dichloro-6-morpholino-1,3,5-triazine); (4) 1-N-[poly(3-allyloxy-2-hydroxypropyl)2-aminoethyl]-2-imidazolidinone; and (5) poly(2-ethyl-2-oxazoline).

13. An ink composition in accordance with claim 1 wherein the lightfast antioxidant is present in an amount of from about 0.25 to about 5 percent by weight and is (1) 2,6-di-tert-butyl-α-dimethylamino-4-cresol; (2) 2,2'-isobutylidene-bis(4,6-dimethyl phenol); (3) 2,2'-methylenebis(6-tert-butyl-4-methylphenol; (4) 2,2'-methylenebis(6-tert-butyl-4-ethylphenol); (5) N-isopropyl-N'-phenyl-phenylene diamine; (6) N-(1,3-dimethylbutyl)-N'-phenyl-phenylene diamine; (7) N,N'-di(2-octyl)-4-phenylene diamine; (8) N,N'-bis(1,4-dimethylpentyl)-4-phenylene diamine; (9) 2,4,6-tris-(N-1,4-dimethyl pentyl-4-phenylenediamino)-1,3,5-triazine; or (10) D-raffinose pentahydrate.

14. An ink composition in accordance with claim 1 wherein the water soluble salt is present in an amount of from about 0.25 to about 10 percent by weight, or from about 1.5 to about 5 percent by weight, and is an inorganic salt selected from the group consisting of (1) lithium bromide; (2) potassium bromide; (3) potassium iodide; (4) sodium chloride; (5) calcium nitrate tetrahydrate; (6) calcium sulfate dihydrate; (7) strontium chloride hexahydrate; (8) zinc nitrate hexahydrate; (9) zinc sulfate heptahydrate; and (10) magnesium nitrate hexahydrate.

15. An ink composition in accordance with claim 1 wherein the water soluble salt is present in an amount of from about 0.25 to about 10 percent by weight, or from about 1.5 to about 5 percent by weight, and is selected from the group consisting of (1) citric acid trilithium salt hydrate; (2) dodecyl sulfate lithium salt; (3) 1-octane sulfonic acid sodium salt; (4) 1-(2-ethoxyphenyl)piperazine monohydrochloride; (5) tris(hydroxymethyl) aminomethane; (6) (4-morpholino ethane sulfonic acid)monohydrate; (7) (4-morpholino propane sulfonic acid); (8) (β-hydroxy-4-morpholino propane sulfonic acid); (9) [N,N-bis(2-hydroxyethyl)-2-amino ethane sulfonic acid]; and (10) [4-(2-hydroxyethyl)-1-piperazine ethane sulfonic acid].

16. An ink composition in accordance with claim 1 wherein the biocide is (1) 2-hydroxypropylmethane thiosulfonate; (2) 2-(thio cyanomethyl thio)benzothiazole; (3) methylene bis(thiocyanate); (4) cationic poly(oxyethylene (dimethylamino)-ethylene (dimethylamino) ethylene dichloride; or (5) a cationic blend of methylene bisthiocyanate, about 50 percent by weight, and dodecyl guanidine hydrochloride, about 50 percent by weight.

17. An ink in accordance with claim 1 wherein the colorant is a pigment, or a dye present in an amount of from about 0.5 to about 20 percent by weight.

18. An ink in accordance with claim 1 wherein the colorant is a pigment of carbon black.

19. An ink in accordance with claim 1 wherein the colorant is a pigment of cyan, magenta, yellow, black, or mixtures thereof.

20. An ink in accordance with claim 1 with a surface tension of about 25 to about 44 dynes/cm, a viscosity of from about 1 centipoise to about 10 centipoise at a temperature of from about 25 to about 50° C., a pH of from about 6.5 to about 8.5, an acoustic-loss value of from about 10 to about 80 dB/mm, and which ink provides images with waterfast values of about 80 to about 95 percent, lightfast values of from about 95 to about 100 percent, and paper curl values of about 5 to about 10 millimeters.

21. A printing process which comprises incorporating into an acoustic ink jet printer the ink of claim 1 and causing droplets of the ink to be ejected in imagewise pattern onto a substrate.

22. An ink composition in accordance with claim 1 wherein the quaternary compound is present in an amount of from about 1 to about 15 percent by weight and is isostearyl ethylimidonium ethyl sulfate, 1-methyl-1-oleyl amidoethyl-2-oleyl-imidazolinium methyl sulfate, dodecyl triphenyl phosphonium bromide, or soya amido propyl ethyl dimonium ethyl sulfate; the ink vehicle is present in an amount of from about 69 to about 5 percent by weight and is ethylene glycol, diethylene glycol, or tetramethylene sulfone; the paper curl compound is present an amount from about 28 to about 5 percent by weight and is 1,4-bis(2-hydroxyethoxy)-2-butyne, pantothenol; the water soluble salt is present in an amount of from about 0.25 to about 10 percent by weight and is zinc sulfate heptahydrate, strontium chloride hexahydrate salt, magnesium nitrate hexahydrate, or tris (hydroxymethyl) aminomethane; the antioxidant is present in an amount of from about 0.25 to about 5 percent by weight and is D-raffinose pentahydrate; the lightfastness component is a UV absorber present in an amount of from about 0.25 to about 5 percent by weight and is N-(4-ethoxycarbonyl phenyl)-N'-ethyl-N'-phenyl formadine; the biocide is present in an amount of from about 0.25 to about 1 percent by weight and is methylene bisthiocyanate, dodecyl guanidine hydrochloride; and the colorant is present in an amount of from about 0.5 to about 10 percent by weight.

23. An ink in accordance with claim 22 wherein said ink provides images with waterfast values of from about 80 to about 95 percent, lightfastness values of from about 95 to about 100 percent, and paper curl values of from about 5 to about 10 millimeters.

24. An aqueous ink composition comprised of (1) a quaternary compound selected from the group consisting of (a) an imidazolium quaternary salt, (b) a phosphonium quaternary salt, (c) an ammonium quaternary salt; or mixtures thereof; (2) a vehicle; (3) a lightfastness compound; (4) an antioxidant; (5) a water soluble organic salt, or a water soluble inorganic salt; (6) a biocide; and (7) a colorant.

25. An ink in accordance with claim 24 further containing water, and wherein said quaternary compound has an average molecular weight $M_w$, of from about 105 to about 995, and which ink yields images with waterfast values of between about 80 to about 95 percent, lightfastness values of about 95 to about 100 percent, and curl values of about 5 to about 10 millimeters.

26. An ink in accordance with claim 1 containing a diluent.

27. An ink in accordance with claim 1 wherein said diluent is water, or is comprised of a mixture of water and an aliphatic glycol.

28. An ink in accordance with claim 27 wherein water is present in an amount of from about 0.75 to about 44 percent by weight.

29. An ink composition comprised of (1) a quaternary compound; (2) an ink vehicle; (3) a lightfastness compound; (4) an antioxidant; (5) a water soluble inorganic salt; and (6) a colorant.

30. An ink composition in accordance with claim 29, which ink is aqueous.

31. An ink composition in accordance with claim 30 further containing water, ink additives, and a paper curl reducing component.

32. An ink composition comprised of (1) a quaternary compound; (2) an ink vehicle; (3) a lightfastness compound; (4) an antioxidant; (5) a water soluble organic salt; and (6) a colorant.

33. An ink composition comprised of (1) a quaternary compound selected from the group consisting of (a) imidazolinium quaternary salts, (b) phosphonium quaternary salts, and (c) ammonium quaternary salts; (2) a liquid ink vehicle; (3) an optional paper-curl reducing compound; (4) a lightfastness component; (5) a lightfastness antioxidant; (6) a substantially water soluble organic salt or a substantially water soluble inorganic salt; (7) a biocide; and (8) a colorant, and wherein said quaternary ammonium salt is present in an amount of from about 1 to about 15 percent by weight and is selected from the group consisting of (1) tridecyloxypropyl dihydroxy ethyl methyl ammonium chloride; (2) methyl bis(2-hydroxy ethyl) coco ammonium chloride; (3) [2-(2-carboxy ethoxy)ethyl]2-(2-hydroxy) ethoxy)ethyl]methyl dodecyl ammonium methyl sulfate; (4) [2-(2-carboxy ethoxy)ethyl][2-(2-hydroxy)ethoxy ethyl]methyl octadecyl ammonium methyl sulfate; (5) N-tetradecyl dimethylnaphthyl methyl ammonium chloride; (6) octadecyl diethanol methyl ammonium chloride; (7) octadecyl dihydroxy ethyl methyl ammonium chloride; (8) bis[(ethyl tallowate)]-2-hydroxyethyl methyl ammonium methyl sulfate; (9) ditallow amido ammonium methyl sulfate; (10) bis hydroxyethyl dihydroxypropyl stearaminium chloride; (11) methyl bis(oleyl amido ethyl)2-hydroxyethyl ammonium methyl sulfate; (12) methyl bis(soya amido ethyl), 2-hydroxyethyl ammonium methyl sulfate; and (13) methyl bis(tallow amido ethyl)2-hydroxy propylammonium methyl sulfate.

34. An ink composition comprised of (1) a quaternary compound selected from the group consisting of (a) imidazolinium quaternary salts, (b) phosphonium quaternary salts, and (c) ammonium quaternary salts; (2) a liquid ink vehicle; (3) an optional paper-curl reducing compound; (4) a lightfastness component; (5) a lightfastness antioxidant; (6) a substantially water soluble organic salt or a substantially water soluble inorganic salt; (7) a biocide; and (8) a colorant, and wherein said paper curl reducing compound is present in the ink composition of from about 28 to about 5 percent by weight and is selected from the group consisting of (1) pentaerythritol propoxylate/ethoxylate; (2) triethanolamine ethoxylate; (3) 1,4-bis(2-hydroxy ethoxy)-2-butyne; (4) pantothenol; (5) 3-octadecyloxy-1,2-propanediol; (6) 3-(4-methoxy phenoxy)-1,2-propanediol; (7) 3-pyrrolidino-1,2-propanediol; (8) 3-piperidino-1,2-propanediol; (9) 3-morpholino-1,2-propanediol; and (10) 4-8-bis (hydroxymethyl)tricyclo [5.2.1.02.6]decane.

35. An ink composition consisting essentially of (1) a quaternary compound selected from the group consisting of (a) imidazolinium quaternary salts, (b) phosphonium quaternary salts, and (c) ammonium quaternary salts; (2) a liquid ink vehicle; (3) a paper-curl reducing compound; (4) a lightfastness component; (5) a lightfastness antioxidant; (6) a substantially water soluble organic salt or a substantially water soluble inorganic salt; (7) a biocide; and (8) a colorant.

* * * * *